United States Patent
Strinden et al.

(10) Patent No.: US 10,296,164 B2
(45) Date of Patent: May 21, 2019

(54) METHODS, APPARATUS AND SYSTEMS FOR MULTI-MODULE PROCESS CONTROL MANAGEMENT

(71) Applicant: FISHER-ROSEMOUNT SYSTEMS, INC., Round Rock, TX (US)

(72) Inventors: Danny Strinden, Austin, TX (US); Ian Uy, Round Rock, TX (US); Prashant Joshi, Leicester (GB); Julian Naidoo, Cedar Park, TX (US); Ram Ramachandran, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 562 days.

(21) Appl. No.: 14/962,379

(22) Filed: Dec. 8, 2015

(65) Prior Publication Data

US 2017/0160901 A1   Jun. 8, 2017

(51) Int. Cl.
*G06F 3/0481* (2013.01)
*G05B 19/10* (2006.01)
(Continued)

(52) U.S. Cl.
CPC ......... *G06F 3/04817* (2013.01); *G05B 19/10* (2013.01); *G05B 23/0216* (2013.01); *G06F 3/04842* (2013.01); *G05B 2219/23258* (2013.01)

(58) Field of Classification Search
CPC ............. G06F 3/04817; G06F 3/04842; G05B 23/0216; G05B 19/10; G05B 2219/23258
See application file for complete search history.

(56) References Cited

U.S. PATENT DOCUMENTS

| 5,812,394 A * | 9/1998 | Lewis | G05B 19/0426 |
| | | | 700/17 |
| 7,783,370 B2 * | 8/2010 | Nixon | G06F 9/4488 |
| | | | 700/83 |

(Continued)

FOREIGN PATENT DOCUMENTS

GB   2469905   11/2010

OTHER PUBLICATIONS

"Equipment module example," excerpt from Books Online files for DeltaV, last retrieved on Mar. 7, 2016 (1 page).
(Continued)

*Primary Examiner* — Carlos R Ortiz Rodriguez
(74) *Attorney, Agent, or Firm* — Hanley, Flight & Zimmerman, LLC

(57) ABSTRACT

Methods, apparatus and systems are disclosed for multi-module process control management. A multi-module view is presented, via a user interface, including a plurality of control modules corresponding to functions of a control process. The multi-module view provides a first set of configuration capabilities associated with the control modules, including the capability to logically connect respective ones of the control modules. In response to the selection of one of the control modules of the multi-module view, a single-module view is presented, via the user interface, including a functional block associated with the selected one of the control modules of the multi-module view. The single-module view provides a second set of configuration capabilities associated with the functional block, including the capability to logically connect the functional block to a respective one of the control modules.

23 Claims, 13 Drawing Sheets

(51) Int. Cl.
*G06F 3/0484* (2013.01)
*G05B 23/02* (2006.01)

(56) References Cited

U.S. PATENT DOCUMENTS

2006/0095855 A1 5/2006 Britt et al.
2007/0168065 A1 7/2007 Nixon et al.

OTHER PUBLICATIONS

"Equipment module example, The COARSE_VALVE and FINE_VALVE control modules," excerpt from Books Online files for DeltaV, last retrieved on Mar. 7, 2016 (1 page).

"Equipment module example, The FLOW_METER control module," excerpt from Books Online files for DeltaV, last retrieved on Mar. 7, 2016 (1 page).

"Equipment module example, The TOTALIZER equipment module," excerpt from Books Online files for DeltaV, last retrieved on Mar. 7, 2016 (2 page).

"Equipment module example, Adding the control modules to the equipment module," excerpt from Books Online files for DeltaV, last retrieved on Mar. 7, 2016 (1 page).

"Equipment module example, Linking to an equipment module in DeltaV Operate," excerpt from Books Online files for DeltaV, last retrieved on Mar. 7, 2016 (1 page).

"Modules: general information, Module hierarchy," excerpt from Books Online files for DeltaV, last retrieved on Mar. 7, 2016 (1 page).

"Equipment definition, Equipment module classes," excerpt from Books Online files for DeltaV, last retrieved on Mar. 7, 2016 (1 page).

"DeltaV Distributed Control System, Advanced Unit Management Software," excerpt from Books Online files for DeltaV, Jan. 2013 (5 pages).

Intellectual Property Office of the United Kingdom, "Search Report under Section 17(5)," issued in connection with Patent Application No. GB1620704.5, dated May 25, 2017, 3 pages.

\* cited by examiner

METHODS, APPARATUS AND SYSTEMS FOR MULTI-MODULE PROCESS CONTROL MANAGEMENT

FIELD OF THE DISCLOSURE

This present disclosure relates generally process control systems and, more particularly, to methods, apparatus and systems for multi-module process control management.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and/or other information pertaining to the field devices, use this information to implement a process control routine and/or control strategy, and then generate control signals that are sent over the buses or other communication lines to the field devices to control the operation of the process. In this manner, the process controllers may execute and coordinate control strategies using the field devices via the buses and/or other communication links communicatively coupling the field devices.

Information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process, etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more software applications that perform campaign management functions, maintenance management functions, virtual control functions, diagnostic functions, real-time monitoring functions, safety-related functions, configuration functions, etc. within the process control system.

Process control engineers create process control diagrams and/or graphics to display important process control information to system operators. This process control information may take the form of a piping and instrumentation diagram (P&ID) that shows the interconnection of process equipment and the instrumentation used to control the process, along with a logical representation of a control strategy for the process.

SUMMARY

Example methods, apparatus and systems for multi-module process control management are described. An example method includes presenting, via a user interface, a multi-module view including a first graphical representation of a control process. The first graphical representation includes a plurality of control modules corresponding to functions of the control process. Respective ones of the control modules have a corresponding module input and a corresponding module output. The multi-module view provides a first set of configuration capabilities associated with the control modules, including a capability to logically connect respective ones of the control modules via corresponding ones of the module inputs and corresponding ones of the module outputs. The example method further includes, in response to a module selection indication identifying a selected one of the control modules of the multi-module view, presenting, via the user interface, a single-module view including a second graphical representation. The second graphical representation includes a functional block associated with the selected one of the control modules of the multi-module view. The functional block has a corresponding block input and a corresponding block output. The single-module view provides a second set of configuration capabilities associated with the functional block, including a capability to logically connect the functional block to a respective one of the control modules via the corresponding block input or the corresponding block output.

An example apparatus includes a user interface to present a multi-module view including a first graphical representation of a control process. The first graphical representation includes a plurality of control modules corresponding to functions of the control process. Respective ones of the control modules have a corresponding module input and a corresponding module output. The user interface is further to, in response to a module selection indication identifying a selected one of the control modules of the multi-module view, present a single-module view including a second graphical representation. The second graphical representation includes a functional block associated with the selected one of the control modules of the multi-module view. The functional block has a corresponding block input and a corresponding block output. The example apparatus further includes a configuration manager to provide, for the multi-module view, a first set of configuration capabilities associated with the control modules, including a capability to logically connect, via a module connection manager, respective ones of the control modules via corresponding ones of the module inputs and corresponding ones of the module outputs. The configuration manager is further to provide, for the single-module view, a second set of configuration capabilities associated with the functional block, including a capability to logically connect, via a block connection manager, the functional block to a respective one of the control modules via the corresponding block input or the corresponding block output.

An example tangible machine-readable storage medium comprises instructions that, when executed, cause a machine to present, via a user interface, a multi-module view including a first graphical representation of a control process. The first graphical representation includes a plurality of control modules corresponding to functions of the control process. Respective ones of the control modules have a corresponding module input and a corresponding module output. The multi-module view provides a first set of configuration capabilities associated with the control modules, including a capability to logically connect respective ones of the control modules via corresponding ones of the module inputs and corresponding ones of the module outputs. When executed, the instructions of the example tangible machine-readable storage medium are further to cause the machine to, in response to a module selection indication identifying a selected one of the control modules of the multi-module view, present, via the user interface, a single-module view including a second graphical representation. The second graphical representation includes a functional block associated with the selected one of the control modules of the multi-module view. The functional block has a corresponding block input and a corresponding block output.

The single-module view provides a second set of configuration capabilities associated with the functional block, including a capability to logically connect the functional block to a respective one of the control modules via the corresponding block input or the corresponding block output.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
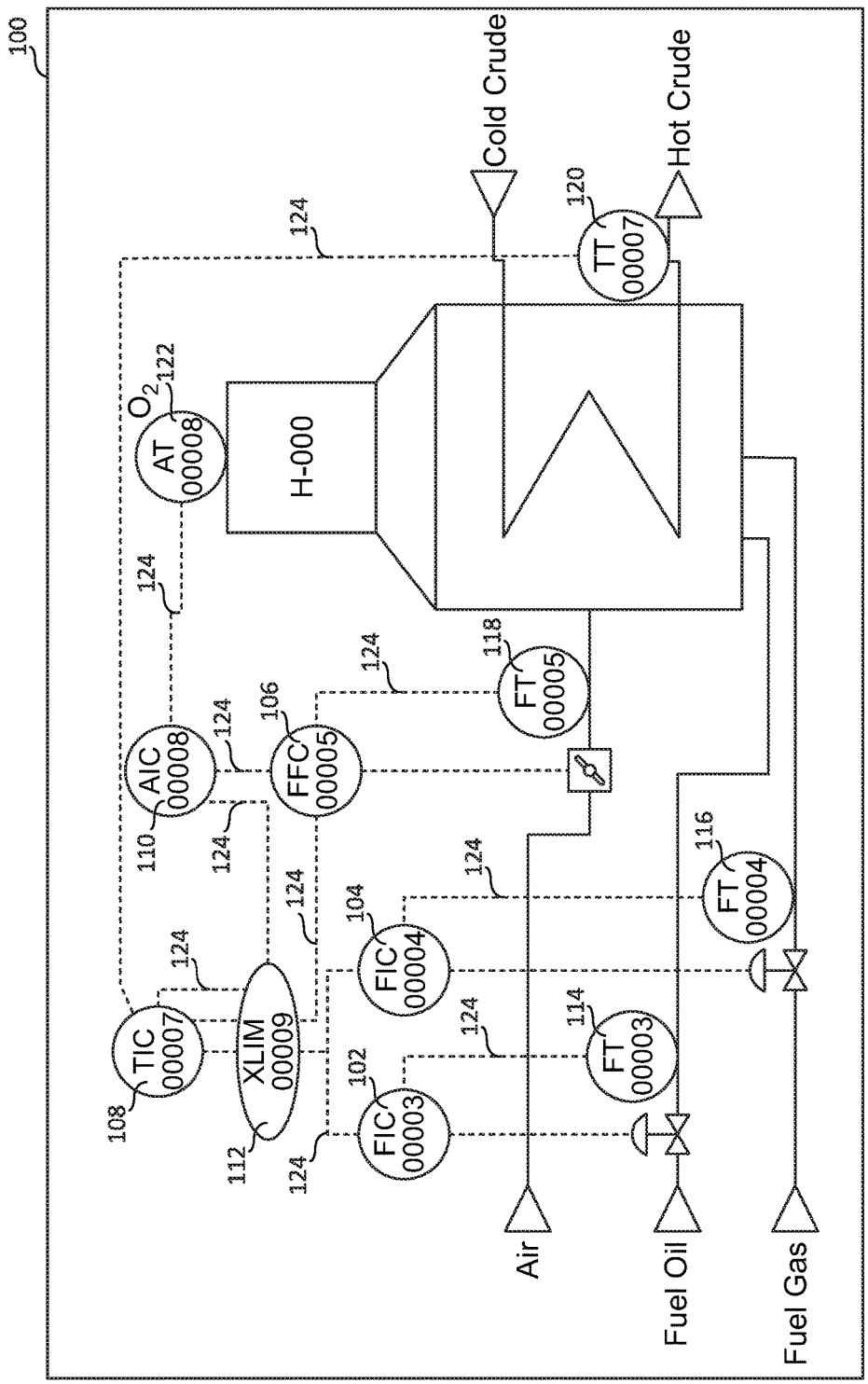
FIG. 1 is an example P&ID representing an example process control strategy for heating crude oil.

In the process control industry, a piping and instrumentation diagram and/or drawing (P&ID) shows the interconnection of process equipment and the instrumentation used to control the process. A process control strategy for an automated process and/or system is illustrated on a P&ID as a set of connected logic symbols. Traditionally, one or more process control engineers interpret, translate and/or fragment the logic symbols illustrated on a P&ID into individual process and/or system functions known as control modules.

While a P&ID provides an overview of the logic for a process control strategy, the fragmented individual control modules do not convey the same holistic picture, particularly when several control modules must work closely with one another to implement a complex process control strategy. For example, examining each fragmented control module in isolation makes it difficult to understand the overall process control strategy, including relationships between the individual control modules and/or the relative order of execution thereof. Examining each fragmented control module in isolation also makes it difficult to troubleshoot and/or debug the process control strategy while the process control strategy is running and/or executing.

The methods, apparatus and systems disclosed herein provide for the development and/or implementation of a multi-module control strategy diagram that advantageously remedies the aforementioned difficulties that arise as a result of fragmenting the process control strategy into individual control modules. The multi-module control strategy diagram disclosed herein allows for representations of multiple control modules to be developed, connected (e.g., wired to one another), and presented together in a multi-module view that is more representative of the connected logic symbols of the P&ID. The multi-module view allows for the inputs and/or outputs of the individual control modules to be configured and connected to one another, and further allows for the relative order of execution of the individual control modules to be configured.

From the multi-module view disclosed herein, a single control module can be selected for further editing and configuration in a single-module view. The single-module view allows for the input(s) and/or output(s) of one or more functional block(s) associated with the selected control module to be configured and connected to one another and/or to the inputs and/or outputs of control modules included in the multi-module view. The single-module view may include a miniaturized representation of the multi-module view that facilitates navigating among the individual control modules included within the multi-module view and/or navigating back to the multi-module view from the single-module view.

The multi-module view and the single-module view advantageously enable a process control engineer to adopt a top-down approach to developing and/or troubleshooting complex process control strategies. For example, the multi-module view enables a process control engineer to design a new process control strategy and/or to modify, test or debug an existing process control strategy and/or the running logic associated therewith at a more abstract level such as, for example, by defining the connections between individual control modules within the multi-module view without being bogged down in the logic details of the process control strategy from the outset of the design and/or modification thereof. As a compliment to the multi-module view, the single-module view enables the process control engineer to further edit and/or configure the logic details associated with a respective one of the control modules selected from the multi-module view should the need to do so arise.

Examples disclosed herein provide for multi-module process control management. In some disclosed examples, a multi-module view including a graphical representation of a control process is presented via a user interface. In some disclosed examples, the multi-module view includes a plurality of control modules corresponding to functions of the control process. In some disclosed examples, respective ones of the control modules have one or more corresponding module input(s) and one ore more corresponding module output(s). In some disclosed examples, the first graphical representation of the control process represents a plurality of process functions of a piping and instrumentation diagram (P&ID) associated with the control process. In some disclosed examples, the first graphical representation of the control process represents a program for execution on a controller.

In some disclosed examples, the first graphical representation is generated based on a control module that has not previously been configured. In some disclosed examples, the first graphical representation is generated by selecting a preconfigured control module from a control module library. In some disclosed examples, the preconfigured control module is reconfigurable. In some disclosed examples, the first graphical representation is generated by selecting a control module class from a control module library. In some disclosed examples, the control module class includes a plurality of preconfigured control modules. In some disclosed examples, respective ones of the preconfigured control modules are reconfigurable. In some disclosed examples, the first graphical representation is re-generated by selecting a control module or a control module class to add to the first graphical representation. In some disclosed examples, the first graphical representation is re-generated by selecting a control module or a control module class to remove from the first graphical representation.

In some disclosed examples, the multi-module view provides a first set of configuration capabilities associated with the control modules. In some disclosed examples, the first set of configuration capabilities includes a capability to logically connect respective ones of the control modules via corresponding ones of the module inputs and corresponding ones of the module outputs. In some disclosed examples, the first set of configuration capabilities includes a capability to configure and/or reconfigure an order of execution of the control modules. In some disclosed examples, the first set of configuration capabilities includes a capability to configure and/or reconfigure a rate of execution for a respective one of the control modules. In some disclosed examples, the first set of configuration capabilities includes a capability to generate an additional corresponding module input or an additional corresponding module output for a respective one of the control modules. In some disclosed examples, the first set of configuration capabilities includes a capability to remove an existing corresponding module input or an existing corresponding module output for a respective one of the control modules. In some disclosed examples, the first set of configuration capabilities includes a capability to name and/or rename a corresponding module input or a corresponding module output of a respective one of the control modules.

In some disclosed examples, a single-module view including a second graphical representation is presented via the user interface. In some disclosed examples, the single-module view is presented in response to a module selection indication identifying a selected one of the control modules of the multi-module view.

In some disclosed examples, the second graphical representation includes one or more functional block(s) associated with the selected one of the control modules of the multi-module view. In some disclosed examples, respective ones of the functional block(s) have one or more corresponding block input(s) and one or more corresponding block output(s). In some disclosed examples, the single-module view includes a miniaturized representation of the multi-module view. In some disclosed examples, the miniaturized representation provides an indication of the selected one of the control modules associated with the functional block(s) of the single-module view.

In some disclosed examples, the single-module view provides a second set of configuration capabilities associated with the functional block(s). In some disclosed examples, the second set of configuration capabilities includes a capability to logically connect respective ones of the functional blocks via corresponding ones of the block inputs and corresponding ones of the block outputs. In some disclosed examples, the second set of configuration capabilities includes a capability to logically connect a respective one of the functional blocks to a respective one of the control modules via a corresponding one of the block inputs or a corresponding one of the block outputs, and further via a corresponding one of the module inputs or a corresponding one of the module outputs. In some disclosed examples, the second set of configuration capabilities includes a capability to logically connect a corresponding block output of a respective one of the functional blocks to a corresponding module input of a respective one of the control modules. In some disclosed examples, the second set of configuration capabilities includes a capability to logically connect a corresponding block input of a respective one of the functional blocks to a corresponding module output of a respective one of the control modules. In some disclosed examples, the second set of configuration capabilities includes a capability to generate an additional corresponding block input or an additional corresponding block output for a respective one of the functional blocks. In some disclosed examples, the second set of configuration capabilities includes a capability to remove an existing corresponding block input or an existing corresponding block output for a respective one of the functional blocks. In some disclosed examples, the second set of configuration capabilities includes a capability to name and/or rename a corresponding block input or a corresponding block output of a respective one of the functional blocks.

FIG. 1 is an example P&ID 100 representing an example process control strategy for heating crude oil. The example P&ID 100 includes an example first control logic symbol 102, an example second control logic symbol 104, an example third control logic symbol 106, an example fourth control logic symbol 108, an example fifth control logic symbol 110, and an example sixth control logic symbol 112. Each of the example control logic symbols 102, 104, 106, 108, 110, 112 is representative of a portion and/or segment of the overall process control strategy illustrated by the P&ID. In some examples, the control logic symbols 102, 104, 106, 108, 110, 112 of the P&ID 100 may be associated with one or more controller(s) (not shown) that execute(s) one or more program(s) in relation to the process function(s)

represented by respective ones of the control logic symbols 102, 104, 106, 108, 110, 112. For example, the first logic symbol 102 may be associated with an example first controller, while the second logic symbol 104 may be associated with an example second controller. Alternatively, the first logic symbol 102 and the second logic symbol 104 may both be associated with a same example controller.

In the illustrated example of FIG. 1, the P&ID 100 further includes an example first field device symbol 114, an example second field device symbol 116, an example third field device symbol 118, an example fourth field device symbol 120, and an example fifth field device symbol 122. The example field device symbols 114, 116, 118, 120, 122 represent field devices (e.g., valves, transmitters, etc.) that communicate with one or more controller(s) to perform process control functions (e.g. control and/or sense temperature, pressure, flow rate, etc.) within the overall process control strategy represented by the P&ID 100.

In the illustrated example of FIG. 1, the P&ID 100 further includes example logical connections 124 that operatively couple respective ones of the of the control logic symbols 102, 104, 106, 108, 110, 112 to one another and/or to respective ones of the field device symbols 114, 116, 118, 120, 122. The logical connections 124 further illustrate the overall process control strategy being represented by the P&ID 100. More specifically, the logical connections 124 represent communication pathways (e.g., wired connections) via which the process controller(s) represented by and/or associated with the control logic symbols 102, 104, 106, 108, 110, 112, and the field device(s) represented by the field device symbols 114, 116, 118, 120, 122, may communicate with one another to implement and/or perform the overall process control strategy represented by the P&ID 100. For example, FIG. 1 illustrates three (3) unique logical connections 124 in relation to the fifth control logic symbol 110. In this regard, the fifth control logic symbol 110 is logically connected to each of the third control logic symbol 106, the sixth control logic symbol 112 and the fifth field device symbol 122.

Figure 2:
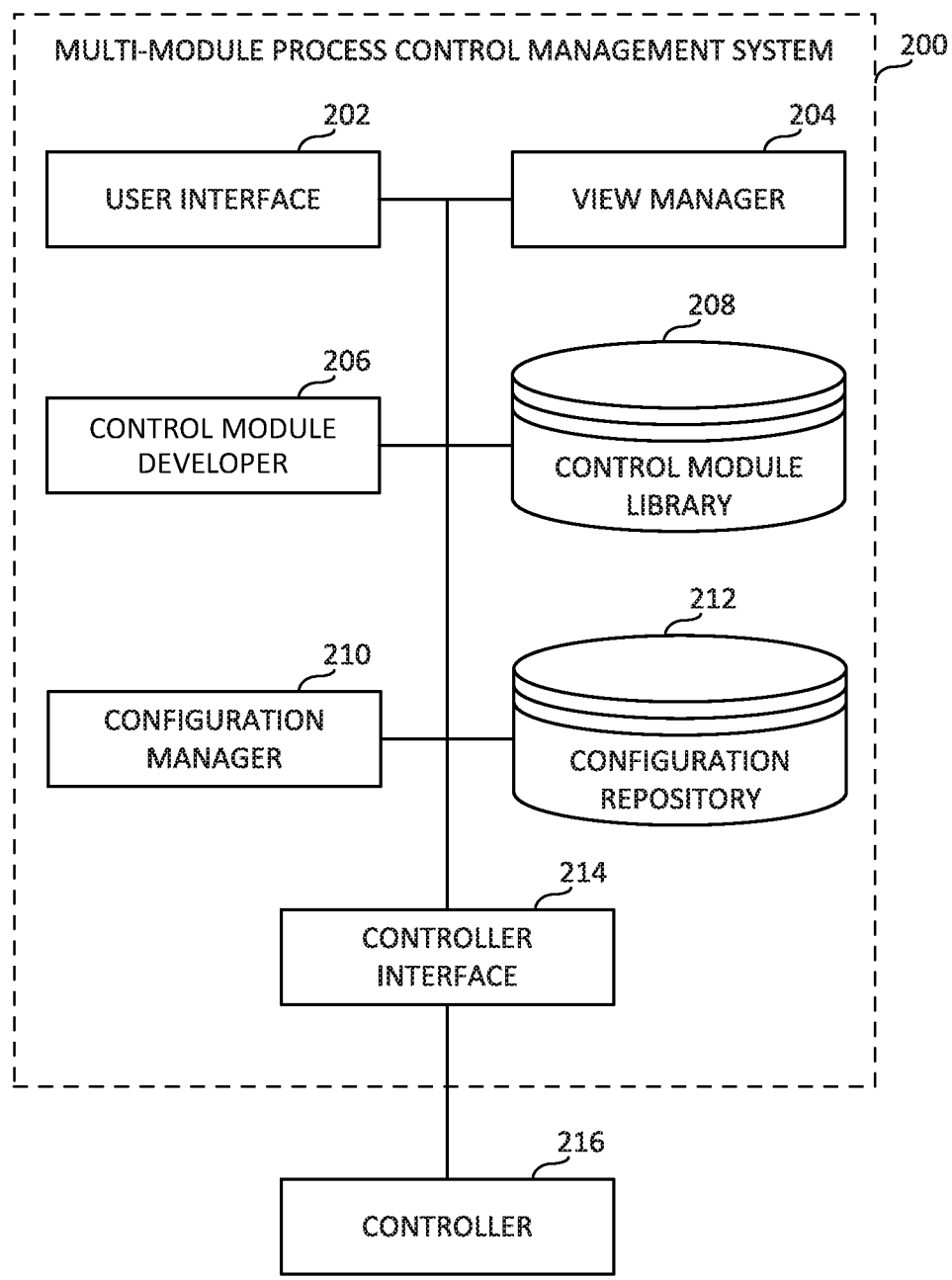
FIG. 2 is a block diagram of an example multi-module process control management system constructed in accordance with the teachings of this disclosure to design, construct, generate, edit and/or configure a process control strategy.

FIG. 2 is a block diagram of an example multi-module process control management system 200 constructed in accordance with the teachings of this disclosure. The multi-module process control management system 200 presents a multi-module view and an associated single-module view that provide the capability to design, construct, generate, edit, configure, test, and/or debug a process control strategy and/or the running logic associated therewith. In the illustrated example of FIG. 2, the multi-module process control management system 200 includes an example user interface 202, an example view manager 204, an example control module developer 206, an example control module library 208, an example configuration manager 210, an example configuration repository 212, and an example controller interface 214. However, other example implementations of the multi-module process control management system 200 may include fewer or additional structures in accordance with the teachings of this disclosure.

In the illustrated example of FIG. 2, the user interface 202 facilitates interactions and/or communications between an end user (e.g., a process control engineer) and the view manager 204, the control module developer 206, the control module library 208, the configuration manager 210, the configuration repository 212, the controller interface 214 and/or, more generally, the multi-module process control management system 200. The user interface 202 includes one or more output device(s) via which the user interface 202 presents information and/or data in textual, graphical and/or audible form to the end user of the multi-module process control management system 200. For example, the user interface 202 may include a display device (e.g., a liquid crystal display, a cathode ray tube display, etc.) for presenting textual and/or graphical information and speakers for presenting audible information.

The user interface 202 also includes one or more input device(s) via which the user interface 202 receives information and/or data from the end user of the multi-module process control management system 200. For example, the user interface 202 may include a keyboard, a mouse, a microphone and/or a liquid crystal display having a touchscreen that enable(s) the end user to convey data and/or commands to the view manager 204, the control module developer 206, the control module library 208, the configuration manager 210, the configuration repository 212, the controller interface 214 and/or, more generally, the multi-module process control management system 200. Data and/or information presented and/or received via the user interface 202 may be of any type, form and/or format, and may be stored in the control module library 208 and/or the configuration repository 212.

The user interface 202 of FIG. 2 presents a multi-module view and an associated single-module view that provide the capability to design, construct, generate, edit, configure, test, and/or debug a process control strategy and/or the running logic associated therewith. In some examples, a multi-module view presented via the user interface 202 includes a plurality of control modules corresponding to functions of a control process represented in the multi-module view. An example multi-module view presented via the user interface 202 is described below in connection with FIGS. 4-5. In some examples, a single-module view presented via the user interface 202 includes one or more functional block(s) corresponding to logic associated with a function represented by a control module included in the multi-module view. An example single-module view presented via the user interface 202 is described below in connection with FIGS. 6-7.

In the illustrated example of FIG. 2, the view manager 204 manages the content (e.g., the graphical and/or textual data and/or information) presented and/or to be presented via the user interface 202 and determines whether and/or when the user interface 202 is to present a multi-module view and/or a single-module view including such content. The view manager 204 also facilitates navigating between the multi-module view and one or more single-module view(s) that may be presented via the user interface 202. In some examples, the view manager 204 assigns the multi-module view as the default view to be presented via the user interface 202. In some examples, the view manager 204 may determine which of the multi-module view and/or the single-module view is to be presented at any given time via the user interface 202 based on one or more input(s) or other indication(s) received via the user interface 202. For example, in response to a module selection input or other indication received via the user interface 202 identifying a selected one of the control modules included within the multi-module view, the view manager 204 may cause a single-module view associated with the selected control module to be presented via the user interface 202. As another example, in response to a multi-module view selection input or other indication received via the user interface 202 while a single-module view is presented, the view manager 204 may cause the presentation of the single-module view to cease and may further cause the multi-module view to be presented via the user interface 202.

In some examples, a multi-module view and a single-module view presented via the user interface 202 may be layered one on top of the other such that only one of the multi-module view or the single-module view may be completely visualized at any given time. In such examples, the view manager 204 may determine which of the multi-module view or the single-module view is to be visualized and/or focused upon, and may cause the multi-module view and the single-module view to be layered accordingly (e.g., with the view that is to be visualized and/or focused presented on top of the other view) when presented via the user interface 202. In other examples, a multi-module view and a single-module view presented via the user interface 202 may be positioned side-by-side or one above the other such that both of the multi-module view and the single-module view may be completely visualized at any given time. In such examples, the view manager 204 may cause the user interface 202 to present one of the multi-module view or the single-module view as an active view and the other of the multi-module view or the single-module view as an inactive view.

In some examples, the view manager 204 may cause a single-module view presented via the user interface 202 to include a miniaturized representation of an associated multi-module view (e.g., a multi-module view that includes the selected control module presented in the single-module view). In some such examples, the miniaturized representation of the multi-module view may provide an indication of the selected one of the control modules from among the multi-module view that is currently presented in the single-module view. In some examples, the miniaturized representation of the multi-module view facilitates navigating among the individual control modules included within the multi-module view and/or navigating to the multi-module view from the single-module view.

In the illustrated example of FIG. 2, the control module developer 206 generates one or more control module(s) having one or more associated functional block(s) to be included among the content of the multi-module view and/or the single-module view(s) to be presented via the example user interface 202. In some examples, the control module developer 206 generates such control module(s) based on one or more input(s) or other indication(s) received via the user interface 202. In some examples, the control module developer 206 may generate one or more control module(s) when the multi-module view is presented via the user interface 202. In other examples, the control module developer 206 may generate one or more control module(s) when the single-module view is presented via the user interface 202. The control module(s) and associated functional block(s) generated by the control module developer 206 provide a configurable framework for the design, development and/or implementation of a process control strategy.

In some examples, the control module developer 206 generates a control module that is not yet configured. For example, the control module developer 206 may generate a control module that has not previously been configured with any input(s), output(s) and/or logical connection(s). In such instances, the control module generated by the control module developer 206 may be described and/or characterized at the time of generation as being blank and/or not yet configured.

In some examples, the control module developer 206 generates a control module by selecting and/or retrieving a preconfigured control module from a data repository such as, for example, the control module library 208 of FIG. 2. In such examples, the selected and/or retrieved control module is preconfigured to include at least one of an input, an output or a logical connection. In some such examples, the preconfigured control module that is selected and/or retrieved by the module developer 206 is reconfigurable such that one or more input(s), output(s) and/or logical connection(s) may be added, removed and or modified.

In some examples, the control module developer 206 generates control modules by selecting and/or retrieving a preconfigured control module class from a data repository such as, for example, the control module library 208 of FIG. 2. In such examples, the selected and/or retrieved control module class includes a plurality of control modules that are preconfigured as to include at least one of an input, an output or a logical connection. In some such examples, the preconfigured control modules of the control module class that is selected and/or retrieved by the module developer are reconfigurable such that one or more input(s), output(s) and/or logical connection(s) may be added, removed and or modified.

In some examples, the control module developer 206 controls, manages and/or facilitates the removal of one or more control module(s) or control module class(es) from among the content of the multi-module view being presented via the example user interface 202. In some examples, the control module developer 206 removes such control module(s) or control module class(es) based on one or more input(s) or other indication(s) received via the user interface 202.

In the illustrated example of FIG. 2, the control module library 208 stores one or more preconfigured and/or template control module(s). The control module library 208 may additionally store one or more preconfigured and/or template control module class(es). In some examples, the control module(s) and/or control module class(es) stored by the control module library 208 may have been generated by the control module developer 206 of FIG. 2.

The control module library 208 of FIG. 2 may be implemented by any type(s) and/or any number(s) of a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which information is stored for any duration (e.g., for extended time periods, permanently, brief instances, for temporarily buffering, and/or for caching of the information). The information stored in the control module library 208 may be stored in any file and/or data structure format, organization scheme, and/or arrangement. The information stored in the control module library 208 is accessible to the user interface 202, the view manager 204, the control module developer 206, the configuration manager 210, the configuration repository 212, the controller interface 214 and/or, more generally, the multi-module process control management system 200 of FIG. 2.

In the illustrated example of FIG. 2, the configuration manager 210 controls, manages and/or facilitates the configuration of the content of the multi-module view and/or the single-module view(s) to be presented via the user interface 202, including for example, the configuration and/or reconfiguration of any control module(s) and associated functional block(s) generated by the control module developer 206. In some examples, the configuration manager 210 controls, manages and/or facilitates the configuration and/or reconfiguration of such control module(s) and/or the functional block(s) associated therewith based on one or more input(s) or other indication(s) received via the user interface 202.

The configuration manager 210 provides a first set of configuration capabilities to facilitate the configuration and/or reconfiguration of one or more control module(s) presented within the multi-module view. In some examples, the first set of configuration capabilities includes a capability to logically connect respective ones of the control modules via corresponding ones of the module inputs and corresponding ones of the module outputs. In some examples, the first set of configuration capabilities includes a capability to configure and/or reconfigure an order of execution of the control modules. In some disclosed examples, the first set of configuration capabilities includes a capability to configure and/or reconfigure a rate of execution for one or more of the control module(s). In some examples, the first set of configuration capabilities includes a capability to generate an additional corresponding module input or an additional corresponding module output for one or more of the control module(s). In some examples, the first set of configuration capabilities includes a capability to remove an existing corresponding module input or an existing corresponding module output for one or more of the control module(s). In some examples, the first set of configuration capabilities includes a capability to name and/or rename a corresponding module input or a corresponding module output of one or more of the control module(s). An example multi-module view including content that has been configured and/or reconfigured via the first set of configuration capabilities provided by the configuration manager 210 is described below in connection with FIGS. 4-5.

The configuration manager 210 further provides a second set of configuration capabilities to facilitate the configuration and/or reconfiguration of one or more functional block(s) presented within the single-module view based on a selected one of the control modules of the multi-module view. In some examples, the second set of configuration capabilities includes a capability to logically connect respective ones of the functional blocks via corresponding ones of the block inputs and corresponding ones of the block outputs. In some examples, the second set of configuration capabilities includes a capability to logically connect one or more of the functional block(s) to one or more of the control module(s). In some examples, the second set of configuration capabilities includes a capability to logically connect a corresponding block output of a functional block to a corresponding module input of a control module. In some examples, the second set of configuration capabilities includes a capability to logically connect a corresponding block input of a functional block to a corresponding module output of a control module. In some examples, the second set of configuration capabilities includes a capability to generate an additional corresponding block input or an additional corresponding block output for one or more of the functional block(s). In some examples, the second set of configuration capabilities includes a capability to remove an existing corresponding block input or an existing corresponding block output for one or more of the functional block(s). In some examples, the second set of configuration capabilities includes a capability to name and/or rename a corresponding block input or a corresponding block output of one or more of the functional block(s). An example single-module view including content that has been configured and/or reconfigured via the second set of configuration capabilities provided by the configuration manager 210 is described below in connection with FIGS. 6-7.

In the illustrated example of FIG. 2, the configuration repository 212 stores one or more configuration(s) and/or configuration parameter(s) associated with the content (e.g., the control modules and/or the functional blocks) presented, to be presented and/or being presented via the multi-module view and/or the single-module view. For example, the configuration repository 212 may store data representing and/or associated with the configuration of a control module including, for example, the identity of the control module, the number and/or identity of any input(s) and/or output(s) of the control module, the routing and/or pathway associated with any logical connection(s) to and/or from the input(s) and/or output(s) of the control module, an order of execution associated with the control module, and/or the routing and/or pathway associated with any logical connection(s) to and/or from the input(s) and/or output(s) of any functional block(s) of the control module.

The configuration repository 212 of FIG. 2 may be implemented by any type(s) and/or any number(s) of a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which information is stored for any duration (e.g., for extended time periods, permanently, brief instances, for temporarily buffering, and/or for caching of the information). The information stored in the configuration repository 212 may be stored in any file and/or data structure format, organization scheme, and/or arrangement. The information stored in the configuration repository 212 is accessible to the user interface 202, the view manager 204, the control module developer 206, the control module library 208, the configuration manager 210, the controller interface 214 and/or, more generally, the multi-module process control management system 200 of FIG. 2.

In the illustrated example of FIG. 2, the controller interface 214 facilitates interactions and/or communications between an example controller 216 and the user interface 202, the view manager 204, the control module developer 206, the control module library 208, the configuration manager 210, the configuration repository 212, and/or, more generally, the multi-module process control management system 200. In some examples, such interactions and/or communications via the controller interface 214 may cause the controller 216 to implement, perform and/or execute some aspect (including the entirety) of a process control strategy that has been configured via the multi-module process control management system 200. While only a single example controller 216 is shown in FIG. 2, the controller interface 214 may interact and/or communicate with any number of controllers that, individually and or collectively, may implement, perform and/or execute some aspect (including the entirety) of the process control strategy that has been configured via the multi-module process control management system 200. The controller interface 214 may be implemented by any type of interface standard including, for example, an Ethernet interface, and may further cause and/or permit the transmission, receipt and/or exchange of data and/or commands via a network (e.g., a local area network (LAN), an Ethernet connection, etc.) to and/or from the example controller 216.

Figure 3:
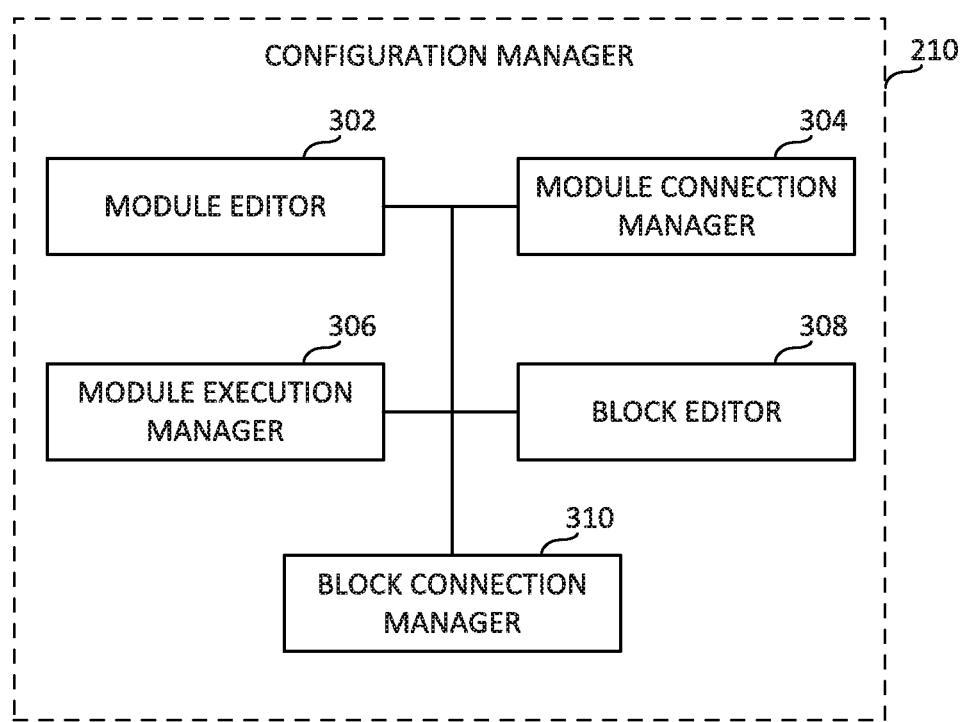
FIG. 3 is a block diagram of the example configuration manager of FIG. 2 constructed in accordance with the teachings of this disclosure.

FIG. 3 is a block diagram of the example configuration manager 210 of FIG. 2 constructed in accordance with the teachings of this disclosure. In the illustrated example of FIG. 3, the configuration manager 210 includes an example module editor 302, an example module connection manager 304, an example module execution manager 306, an example block editor 308, and an example block connection manager 310. However, other example implementations of the configuration manager 210 may include fewer or additional structures in accordance with the teachings of this disclosure.

In the illustrated example of FIG. 3, the module editor 302 enables, performs and/or carries out the generation of an additional corresponding module input or an additional corresponding module output for one or more of the control module(s) included in the multi-module view presented via the user interface of FIG. 2. The module editor 302 further enables, performs and/or caries out the removal of an existing corresponding module input or an existing corresponding module output for one or more of such control module(s). The module editor 302 further enables, performs and/or carries out the naming and/or renaming of a corresponding module input or a corresponding module output of one or more of such control module(s). The module editor 302 further enables, performs and/or carries out the configuring and/or reconfiguring of a rate of execution of one or more of such control module(s). In some examples, the module editor 302 performs the aforementioned operations based on one or more input(s) or other indication(s) received via the user interface 202.

In the illustrated example of FIG. 3, the module connection manager 304 enables, performs and/or carries out the generation, removal and/or modification of logical connections between respective ones of the control modules included in the multi-module view presented via the example user interface of FIG. 2. The module connection manager 304 enables, performs and/or carries out the generation, removal and/or modification of such logical connections via corresponding ones of the module inputs and corresponding ones of the module outputs. In some examples, the module connection manager 304 performs the aforementioned operations based on one or more input(s) or other indication(s) received via the user interface 202.

In the illustrated example of FIG. 3, the module execution manager 306 enables, performs and/or carries out the configuration and/or reconfiguration of an order of execution of the control modules included in the multi-module view presented via the example user interface of FIG. 2. In some examples, the module execution manager 306 performs the aforementioned operations based on one or more input(s) or other indication(s) received via the user interface 202.

In the illustrated example of FIG. 3, the block editor 308 enables, performs and/or carries out the generation of an additional corresponding block input or an additional corresponding block output for one or more of the functional block(s) included in the single-module view presented via the user interface of FIG. 2. The block editor 308 further enables, performs and/or carries out the removal of an existing corresponding block input or an existing corresponding block output for such functional block(s). The block editor 308 further enables, performs and/or carries out the naming and/or renaming of a corresponding block input or a corresponding block output of such functional block(s). In some examples, the block editor 308 performs the aforementioned operations based on one or more input(s) or other indication(s) received via the user interface 202.

In the illustrated example of FIG. 3, the block connection manager 310 enables, performs and/or carries out the generation, removal and/or modification of logical connections between one or more functional block(s) included in the single-module view presented via the user interface of FIG. 2 and one or more control module(s) included within the multi-module view. In some examples, the block connection manager 310 enables, performs and/or carries out the generation, removal and/or modification of a logical connection between a corresponding block output of a functional block and a corresponding module input of a control module. In some examples, the block connection manager 310 enables, performs and/or carries out the formation, removal and/or modification of a logical connection between a corresponding block input of a functional block and a corresponding module output of a control module. In some examples, the block connection manager 310 performs the aforementioned operations based on one or more input(s) or other indication(s) received via the user interface 202.

While an example manner of implementing the example multi-module process control management system 200 is illustrated in FIGS. 2-3, one or more of the elements, processes and/or devices illustrated in FIGS. 2-3 may be combined, divided, re-arranged, omitted, eliminated and/or implemented in any other way. Further, the example user interface 202, the example view manager 204, the example control module developer 206, the example control module library 208, the example configuration manager 210, the example configuration repository 212, the example controller interface 214, the example module editor 302, the example module connection manager 304, the example module execution manager 306, the example block editor 308, the example block connection manager 310 and/or, more generally, the example multi-module process control management system 200 of FIGS. 2-3 may be implemented by hardware, software, firmware and/or any combination of hardware, software and/or firmware. Thus, for example, any of the example user interface 202, the example view manager 204, the example control module developer 206, the example control module library 208, the example configuration manager 210, the example configuration repository 212, the example controller interface 214, the example module editor 302, the example module connection manager 304, the example module execution manager 306, the example block editor 308, the example block connection manager 310 and/or, more generally, the example multi-module process control management system 200, could be implemented by one or more analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 202, the example view manager 204, the example control module developer 206, the example control module library 208, the example configuration manager 210, the example configuration repository 212, the example controller interface 214, the example module editor 302, the example module connection manager 304, the example module execution manager 306, the example block editor 308, the example block connection manager 310 and/or, more generally, the example multi-module process control management system 200 is/are hereby expressly defined to include a tangible computer readable storage device or storage disk such as a memory, a digital versatile disk (DVD), a compact disk (CD), a Blu-ray disk, etc. storing the software and/or firmware. Further still, the example multi-module process control management system 200 of FIGS. 2-3 may include one or more element(s), process(es) and/or device(s) in addition to, or instead of, those illustrated in FIGS. 2-3, and/or may include more than one of any or all of the illustrated elements, processes and devices.

Figure 4:
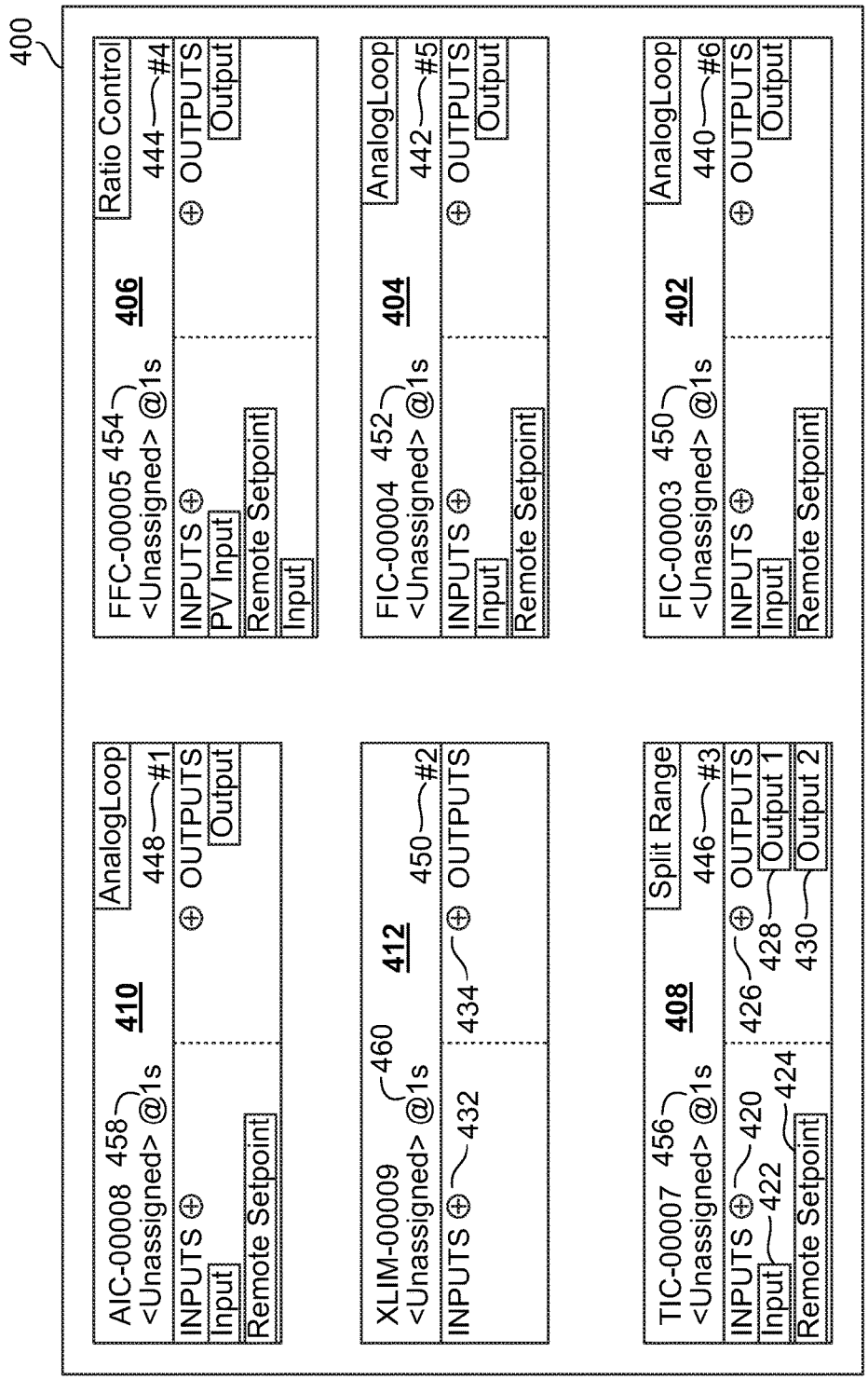
FIG. 4 is an example multi-module view presented via the example user interface of FIG. 2.

FIG. 4 is an example multi-module view 400 presented via the example user interface 202 of FIG. 2. In the illustrated example of FIG. 4, the content of the example multi-module view 400 is derived in part from the content of the example P&ID 100 of FIG. 1. For example, the multi-module view 400 includes an example first control module 402 corresponding to the example first control logic symbol 102 of FIG. 1, an example second control module 404 corresponding to the example second control logic symbol 104 of FIG. 1, an example third control module 406 corresponding to the example third control logic symbol 106 of FIG. 1, an example fourth control module 408 corresponding to the example fourth control logic symbol 108 of FIG. 1, an example fifth control module 410 corresponding to the example fifth control logic symbol 110 of FIG. 1, and an example sixth control module 412 corresponding to the example sixth control logic symbol 112 of FIG. 1.

In the illustrated example of FIG. 4, the control modules 402, 404, 406, 408, 410, 412 included in the multi-module view 400 have been generated by the control module developer 206 of FIG. 2. In some examples, the control module developer 206 may have generated one or more of the control modules 402, 404, 406, 408, 410, 412 by selecting and/or retrieving such control module(s) from the control module library 208 of FIG. 2. In other examples, one or more of the control modules 402, 404, 406, 408, 410, 412 may have initially been generated by the control module developer 206 as a blank control module.

In the illustrated example of FIG. 4, each of the control modules 402, 404, 406, 408, 410, 412 includes corresponding sets of configurable module inputs and configurable module outputs. For example, the fourth control module 408 includes an example corresponding set of configurable module inputs 420 that has been configured to include an example first module input 422 (identified as "Input" in FIG. 4) and an example second module input 424 (identified as "Remote Setpoint" in FIG. 4). The fourth control module 408 also includes an example corresponding set of configurable module outputs 426 that has been configured to include an example first module output 428 (identified as "Output 1 " in FIG. 4) and an example second module input 430 (identified as "Output 2 " in FIG. 4). As another example, the sixth control module 412 includes an example corresponding set of configurable module inputs 432 and an example corresponding set of configurable module outputs 434, neither of which have been configured to include any identified and/or named module inputs and/or module outputs.

In the illustrated example of FIG. 4, each of the control modules 402, 404, 406, 408, 410, 412 has been configured with a respective execution position associated with an order of execution for the control modules 402, 404, 406, 408, 410, 412. For example, the first control module 402 has been configured with an example execution position 440 (identified as "#6 " in FIG. 4), the second control module 404 has been configured with an example execution position 442 (identified as "#5 " in FIG. 4), the third control module 406 has been configured with an example execution position 444 (identified as "#4" in FIG. 4), the fourth control module 408 has been configured with an example execution position 446 (identified as "#3 " in FIG. 4), the fifth control module 410 has been configured with an example execution position 448 (identified as "#1 " in FIG. 4), and the sixth control module 412 has been configured with an example execution position 450 (identified as "#2 " in FIG. 4). Accordingly, in the example of FIG. 4, the fifth control module 410 is the initial control module to execute in the overall process control strategy represented by the content of the example multi-module view 400, while the first control module 402 is the final control module to execute.

In the illustrated example of FIG. 4, each of the control modules 402, 404, 406, 408, 410, 412 has been configured with a respective rate of execution. For example, the first control module 402 has been configured with an example execution rate 450 (identified as "1s" in FIG. 4), the second control module 404 has been configured with an example execution rate 452 (identified as "1s" in FIG. 4), the third control module 406 has been configured with an example execution rate 454 (identified as "1s" in FIG. 4), the fourth control module 408 has been configured with an example execution rate 456 (identified as "1s" in FIG. 4), the fifth control module 410 has been configured with an example execution rate 458 (identified as "1s" in FIG. 4), and the sixth control module 412 has been configured with an example execution rate 460 (identified as "1s" in FIG. 4). Although each example execution rate 450, 452, 454, 456, 458, 460 in the illustrated example of FIG. 4 has the same execution rate value (commonly identified as "1s" in FIG. 4), the respective execution rates of the control modules 402, 404, 406, 408, 410, 412 may differ from one another and need not be the same.

In the illustrated example of FIG. 4, the control modules 402, 404, 406, 408, 410, 412 have not yet been configured to include any logical connections between the corresponding module inputs and/or corresponding module outputs of such control modules. For example, no logical connection has been formed and/or configured between the first module output 428 of the fourth control module 408 and any module input corresponding to any of the first control module 402, the second control module 404, the third control module 406, the fifth control module 410, or the sixth control module 412.

Figure 5:
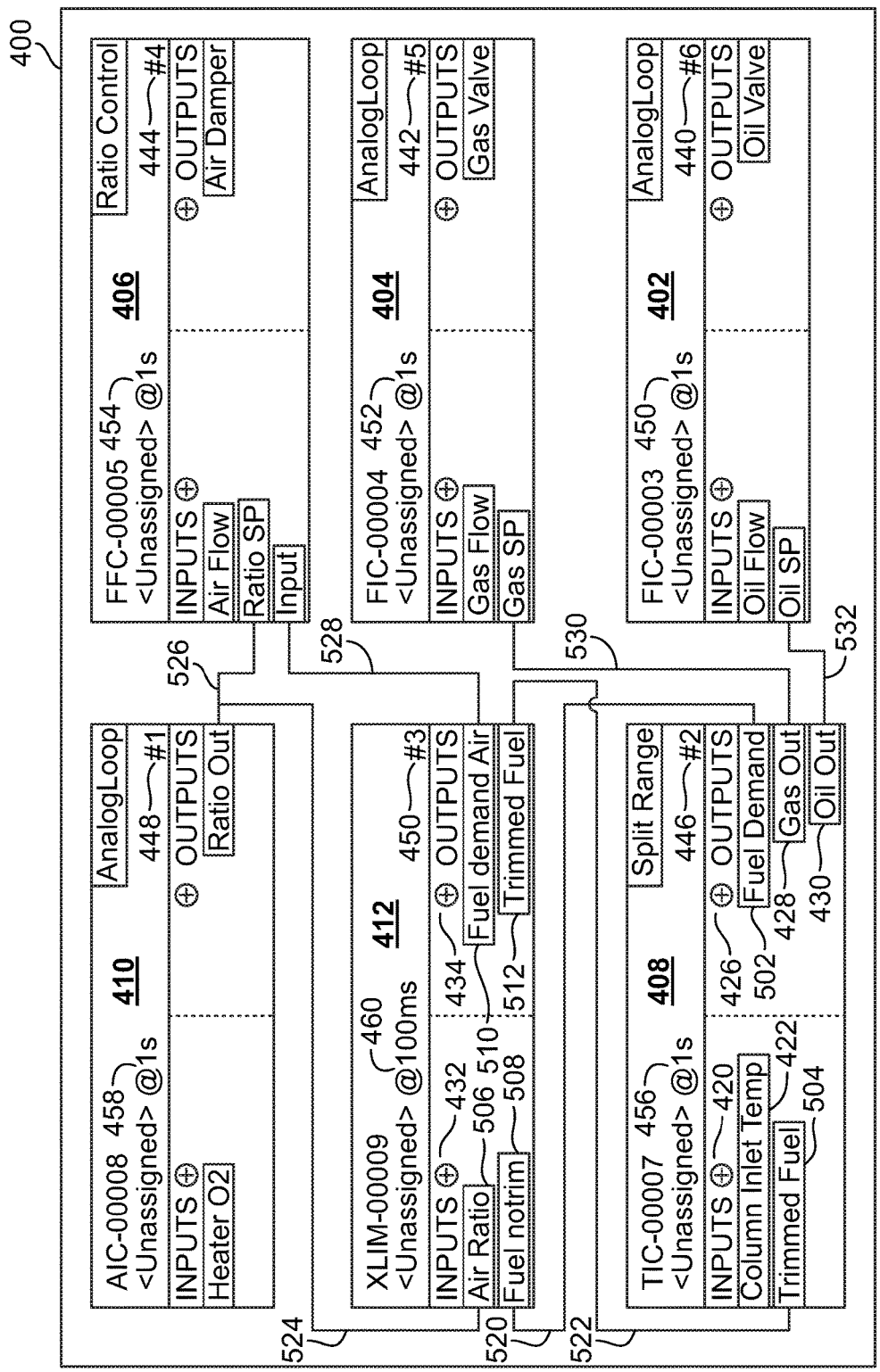
FIG. 5 is the example multi-module view of FIG. 4 including content that has been configured and/or reconfigured via the example configuration manager of FIGS. 2-3.

FIG. 5 is the example multi-module view 400 of FIG. 4 including content that has been configured and/or reconfigured via the configuration manager 210 of FIGS. 2-3. In the illustrated example of FIG. 5, the configured and/or reconfigured content of the example multi-module view 400 is derived from the example content of the multi-module view 400 illustrated in FIG. 4. The configured and/or reconfigured content of the multi-module view illustrated in connection with FIG. 5 represents a process control strategy that may be implemented, performed and/or executed, in whole or in part, by one or more controller(s) such as, for example, the controller 216 of FIG. 2.

In the illustrated example of FIG. 5, the fourth control module 408 of FIG. 4 has been configured and/or reconfigured via the module editor 302 of FIG. 3 such that the identifications and/or names of the first module input 422, the first module output 428 and the second module output 430 of the fourth control module 408 have changed.

For example, the name of the first module input 422 (identified as "Input" in FIG. 4) has been modified to be identified as "Column Inlet Temp" in connection with the example of FIG. 5. Similarly, the name of the first module output 428 (identified as "Output 1 " in FIG. 4) has been modified to be identified as "Gas Out", and the name of the second module output 430 (identified as "Output 2 " in FIG. 4) has been modified to be identified as "Oil Out" in connection with the example of FIG. 5.

In the illustrated example of FIG. 5, the corresponding set of module outputs 426 of the fourth control module 408 of FIG. 4 has been configured and/or reconfigured via the module editor 302 of FIG. 3 to include an additional example module output 502 (e.g., the third module output 502 identified as "Fuel Demand" in FIG. 5). In the illustrated example of FIG. 5, the second module input 424 (identified as "Remote Setpoint" in FIG. 4) has been configured and/or reconfigured via the module editor 302 of FIG. 3 to have been removed and replaced by a different example module input 504 (e.g., the different second module input 504 identified as "Trimmed Fuel" in FIG. 5). As described below in connection with FIGS. 6-7, the removal and replacement of the second module input 424 of the fourth control module 408 of FIG. 4 with the different second module input 504 as shown in FIG. 5 may additionally and/or alternatively be enabled and/or performed via the block editor 308 and/or the block connection manager 310 of FIG. 3.

In the illustrated example of FIG. 5, the corresponding set of module inputs 432 of the sixth control module 412 of FIG. 4 has been configured and/or reconfigured via the module editor 302 of FIG. 3 to include an example first module input 506 (identified as "Air Ratio" in FIG. 5) and an example second module input 508 (identified as "Fuel no trim" in FIG. 5). The corresponding set of module outputs 434 of the sixth control module 412 of FIG. 4 has also been configured and/or reconfigured via the module editor 302 of FIG. 3 to include an example first module output 510 (identified as "Fuel demand Air" in FIG. 5) and an example second module output 512 (identified as "Trimmed Fuel" in FIG. 5).

In the illustrated example of FIG. 5, the fourth control module 408 and the sixth control module 412 of FIG. 4 have been configured and/or reconfigured via the module execution manager 306 of FIG. 3 such that the identifications of the execution position 446 associated with the fourth control module 408 and the execution position 450 associated with the sixth control module 412 have changed. For example, the execution position 446 (identified as "#3" in FIG. 4) associated with the fourth control module 408 has been modified to be identified as "#2" in FIG. 5, and the execution position 450 (identified as "#2" in FIG. 4) associated with the sixth control module 412 has been modified to be identified as "#3" in FIG. 5.

In the illustrated example of FIG. 5, the sixth control module 412 of FIG. 4 has been configured and/or reconfigured via the module editor 302 of FIG. 3 such that the identification of the execution rate 460 of the sixth control module 412 has changed.

For example, the execution rate 460 (identified as "1s" in FIG. 4) of the sixth control module 412 has been modified to be identified as "100 ms" in connection with the example of FIG. 5.

In the illustrated example of FIG. 5, the control modules 402, 404, 406, 408, 410, 412 of FIG. 4 have been configured and/or reconfigured via the module connection manager 304 of FIG. 3 to include example logical connections 520, 522, 524, 526, 528, 530, 532 between respective ones of the control modules 402, 404, 406, 408, 410, 412 of the example multi-module view 400. For example, the logical connection 520 has been formed and/or configured between the third module output 502 (identified as "Fuel Demand" in FIG. 5) of the fourth control module 408 and the second module input 508 (identified as "Fuel no trim" in FIG. 5) of the sixth control module 412. As another example, the logical connection 522 has been formed and/or configured between the second module output 512 (identified as "Trimmed Fuel" in FIG. 5) of the sixth control module 412 and the different second module input 504 (identified as "Trimmed Fuel" in FIG. 5) of the fourth control module 408.

Although not specifically described above in connection with FIGS. 4 and 5, other modifications and/or changes that have been made via one or more of the module editor 302, the module connection manager 304 and/or the module execution manager 306 of FIG. 3 to the configuration parameters associated with respective ones of the control modules 402, 404, 406, 408, 410, 412 are readily apparent from a comparison of the content of the multi-module view 400 as shown in FIG. 5 relative to the content of the multi-module view 400 as shown in FIG. 4.

Figure 6:
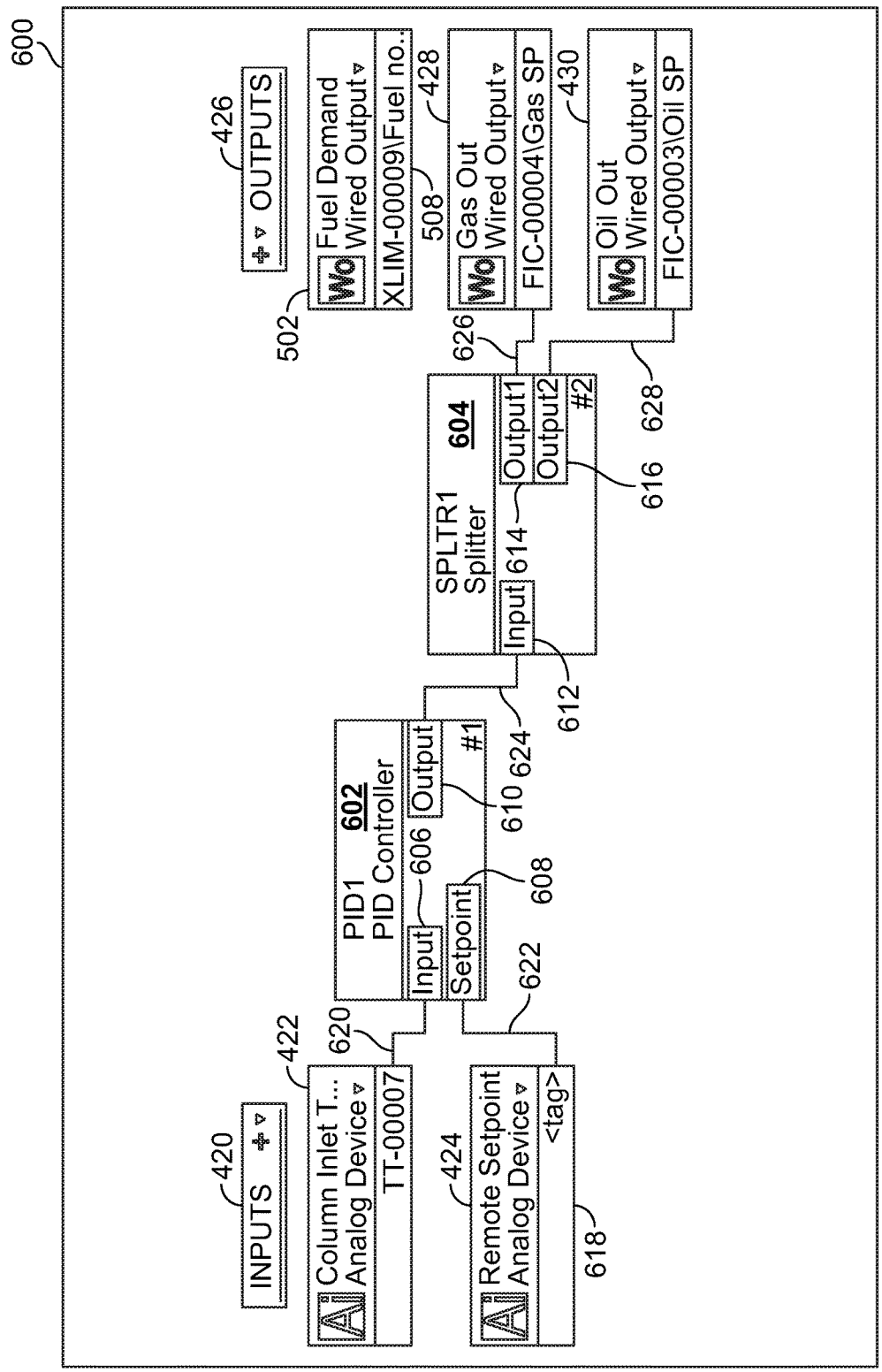
FIG. 6 is an example single-module view presented via the example user interface of FIG. 2.

FIG. 6 is an example single-module view 600 presented via the example user interface 202 of FIG. 2. In the illustrated example of FIG. 6, the content of the example single-module view 600 is derived in part from the example content of the multi-module view 400 illustrated in FIG. 4. In this regard, the example single-module view 600 of FIG. 6 includes content that may be presented in connection with and/or during the course of configuring and/or reconfiguring the content of one or more of the example control module(s) 402, 404, 406, 408, 410, 412 included within the example multi-module view 400 illustrated in FIG. 4 to become and/or take the form of the content of the multi-module view 400 illustrated in FIG. 5.

In the illustrated example of FIG. 6, the example view manager 204 of FIG. 2 has caused the content of the example single-module view 600 to be presented via the user interface 202 of FIG. 2 based on a module selection input or other indication received by the view manager 204 identifying the example fourth control module 408 of FIG. 4 as the selected control module upon which the content of the example single-module view 600 is to be based.

In the illustrated example of FIG. 6, the content of the example single-module view 600 includes an example first functional block 602 and an example second functional block 604, both of which correspond to the selected example fourth control module 408 of FIG. 4. In the illustrated example of FIG. 6, each of the functional blocks 602, 604 includes a corresponding set of configurable block inputs and a corresponding set of configurable block outputs. For example, the first functional block 602 includes an example corresponding set of configurable block inputs that has been configured to include an example first block input 606 (identified as "Input" in FIG. 6) and an example second block input 608 (identified as "Setpoint" in FIG. 6). The first functional block 602 also includes an example corresponding set of configurable block outputs that has been configured to include an example first block output 610 (identified as "Output" in FIG. 6). As another example, the second functional block 604 includes an example corresponding set of configurable block inputs that has been configured to include an example first block input 612 (identified as "Input" in FIG. 6). The second functional block 604 also includes an example corresponding set of configurable block outputs that has been configured to include an example first block output 614 (identified as "Output 1" in FIG. 6) and an example second block output 616 (identified as "Output 2" in FIG. 6).

Although the example of FIG. 6 illustrates two functional blocks corresponding to the selected control module, any number of functional blocks may correspond to a selected control module, including a single functional block. Similarly, each functional block corresponding to a selected control module may include any number of corresponding block inputs and corresponding block outputs.

In the illustrated example of FIG. 6, the content of the example single-module view 600 further includes the example corresponding set of module inputs 420 and the example corresponding set of module outputs 426 of the example fourth control module 408 of FIG. 4, as partially modified, configured and/or reconfigured in the course of transitioning from the content of the multi-module view 400 as shown in FIG. 4 to the content of the multi-module view 400 as shown in FIG. 5. For example, as illustrated in FIG.

6, the content of the single-module view 600 includes the example first module input 422 of the example fourth control module 408 of FIG. 5 (identified as "Column Inlet Temp" in FIGS. 5 and 6), the example second module input 424 of the example fourth control module 408 of FIG. 4 (identified as "Remote Setpoint" in FIGS. 4 and 6), the example first module output 428 of the example fourth control module 408 of FIG. 5 (identified as "Gas Out" in FIGS. 5 and 6), the example second module output 430 of the example fourth control module 408 of FIG. 5 (identified as "Oil Out" in FIGS. 5 and 6), and the example third module output 502 of the example fourth control module 408 of FIG. 5 (identified as "Fuel Demand" in FIGS. 5 and 6).

In the illustrated example of FIG. 6, the content of the example single-module view 600 further includes, for respective ones of the module inputs and module outputs of the example fourth control module 408, a module input, module output and/or identifier of the respective control module(s) 402, 404, 406, 408, 410 412 with which the module input or module output of the fourth control module 408 may be associated and/or logically connected to in the course of transitioning from the content of the multi-module view 400 as shown in FIG. 4 to the content of the multi-module view 400 as shown in FIG. 5. For example, as shown in FIG. 6, the third module output 502 (identified as "Fuel Demand" in FIG. 6) of the fourth control module 408 of FIG. 5 is bound to and/or associated with the second module input 508 (identified as "XLIM-00009\Fuel no trim" in FIG. 6) of the sixth control module 412 of FIG. 5.

As another example, the second module input 424 (identified as "Remote Setpoint" in FIG. 6) of the fourth control module 408 of FIG. 4 is bound to and/or associated with an example identifier 618 (identified as "<tag>" in FIG. 6).

In the illustrated example of FIG. 6, the content of the example single-module view 600 further includes example logical connections 620, 622, 624, 626, 628 that have been configured and/or reconfigured to connect the example block inputs and the example block outputs of the example functional blocks 602, 604 to one another and/or to one or more of the example module input(s) or the example module output(s) of the control module(s) 402, 404, 406, 408, 410, 412. For example, the content of the single-module view 600 of FIG. 6 includes the logical connection 624 between the first block output 610 (identified as "Output" in FIG. 6) of the first functional block 602 and the first block input 612 (identified as "Input" in FIG. 6) of the second functional block 604. As another example, the content of the single-module view 600 of FIG. 6 includes the logical connection 622 between the second block input 608 (identified as "Setpoint" in FIG. 6) of the first functional block 602 and the identifier 618 (identified as "<tag>" in FIG. 6) that is bound to and/or associated with the second module input 424 (identified as "Remote Setpoint" in FIG. 6) of the fourth control module 408.

Figure 7:
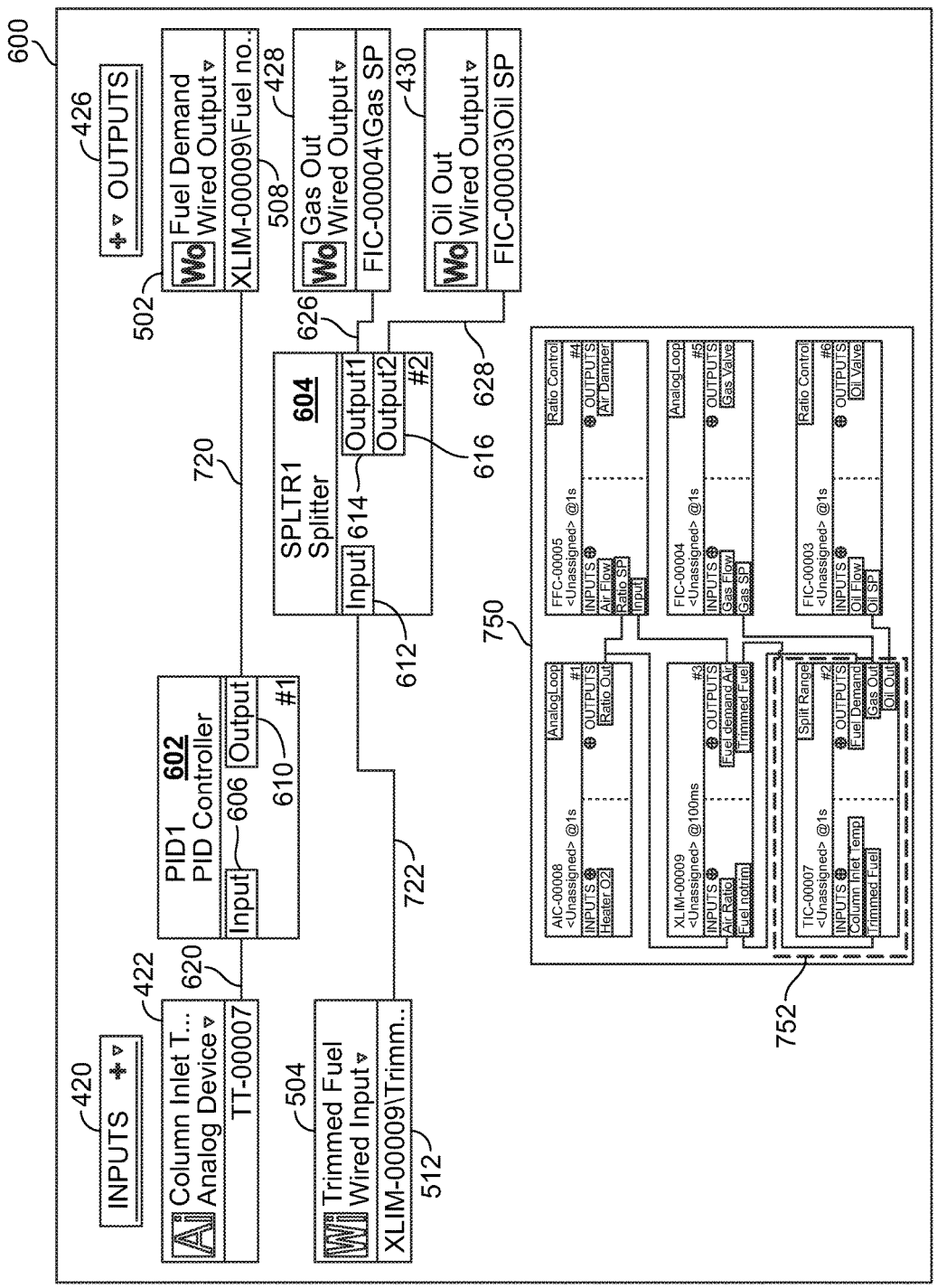
FIG. 7 is the example single-module view of FIG. 6 including content that has been configured and/or reconfigured via the example configuration manager of FIGS. 2-3.

FIG. 7 is the example single-module view 600 of FIG. 6 including content that has been configured and/or reconfigured via the example configuration manager 210 of FIGS. 2-3. In the illustrated example of FIG. 7, the content of the example single-module view 600 is derived from the example content of the multi-module view 400 illustrated in FIG. 5. Alternatively, the content of the example single-module view 600 of FIG. 7 may be derived in part from the content of the example single-module view 600 of FIG. 6. In the illustrated example of FIG. 7, the view manager 204 of FIG. 2 has caused the content of the example single-module view 600 to be presented via the user interface 202 of FIG. 2 based on a module selection input or other indication received by the view manager 204 via the user interface 202 identifying the example fourth control module 408 of FIG. 5 as the selected control module upon which the content of the example single-module view 600 is to be based.

In the illustrated example of FIG. 7, the content of the example single-module view 600 reflects that several modifications and/or changes have been made to the content of the example single-module view 600 as shown in FIG. 6. For example, the second block input 608 (identified as "Setpoint" in FIG. 6) of the first functional block 602 of FIG. 6 has been configured and/or reconfigured via the block editor 308 of FIG. 3 to have been removed from the first functional block 602 as shown in FIG. 7. As another example, the second module input 424 (identified as "Remote Setpoint" in FIG. 6) of the fourth control module 408 of FIG. 6 has been configured and/or reconfigured via the block editor 308 of FIG. 3 to have been removed and replaced with the different second module input 504 (identified as "Trimmed Fuel" in FIG. 7) of the fourth control module 408. Similarly, the identifier 618 (identified as "<tag>" in FIG. 6) associated with the second module input 424 (identified as "Remote Setpoint" in FIG. 6) of the fourth control module 408 of FIG. 6 has been configured and/or reconfigured via the block editor 308 of FIG. 3 to have been removed and replaced with the second module output 512 (identified as "XLIM-00009 Trimmed Fuel" in FIG. 7) of the sixth control module 412 now associated with the different second module input 504 (identified as "Trimmed Fuel" in FIG. 7) of the fourth control module 408.

In the illustrated example of FIG. 7, the content of the example single-module view 600 further reflects that several modifications and/or changes have been made to the example logical connections 620, 622, 624, 626, 628 included among the content of the example single-module view 600 as shown in FIG. 6. For example, an example logical connection 720 has been formed and/or configured via the block connection manager 310 of FIG. 3 between the first block output 610 (identified as "Output" in FIG. 7) of the first functional block 602 and the second module input 508 (identified as "XLIM-00009\Fuel no trim" in FIG. 7) of the sixth control module 412 that is bound to and/or associated with the third module output 502 (identified as "Fuel Demand" in FIG. 7) of the fourth control module 408. As another example, the logical connection 622 and the logical connection 624 of FIG. 6 have been configured and/or reconfigured via the block connection manager 310 of FIG. 3 to have been removed and replaced with an example logical connection 722 that has been formed between the first block input 612 (identified as "Input" in FIG. 7) of the second functional block 604 and the second module output 512 (identified as "XLIM-00009\Trimmed Fuel" in FIG. 7) of the sixth control module 412 associated with the different second module input 504 (identified as "Trimmed Fuel" in FIG. 7) of the fourth control module 408.

In the illustrated example of FIG. 7, the content of the example single-module view 600 includes an example miniaturized representation 750 of the example multi-module view 400 of FIG. 5 and/or the content thereof. For example, the miniaturized representation 750 includes the control modules 402, 404, 406, 408, 410, 412 of FIG. 5 along with their respective corresponding sets of inputs and corresponding sets of outputs, as well as the logical connections 520, 522, 524, 526, 528, 530, 532 between the inputs and outputs thereof. In the illustrated example of FIG. 7, the miniaturized representation 750 further includes an example indicator 752 that identifies the selected one of the control modules from among the control modules 402, 404, 406, 408, 410, 412 of the multi-module view 400 of FIG. 5 that is currently presented in the example single-module view 600 of FIG. 7. For example, the indicator 752 of FIG. 7 identifies the fourth control module 408 of FIG. 5 as the selected control module that is currently presented in the single-module view 60)) of FIG. 7.

In some examples, the miniaturized representation 750 of FIG. 7 facilitates navigating among the control modules 402, 404, 406, 408, 410, 412 included within the multi-module view 400X) of FIG. 5 and/or navigating to the multi-module view 400 of FIG. 5 from the single-module view 600 of FIG. 7. For example, based on an input or other indication provided by the user interface 202 to the view manager 204 of FIG. 2 in response to an end user's interaction with the miniaturized representation 750 (e.g., based on the end user clicking on a portion of the miniaturized representation 750), the view manager 204 may cause the content of the single-module view 600 of FIG. 7 to be changed such that content associated with one of the control modules 402, 404, 406, 410, 412 other than the fourth control module 408 is presented in the single-module view 600 via the user interface 202. As another example, based on an input or other indication provided by the user interface 202 to the view manager 204 of FIG. 2 in response to an end user's interaction with the miniaturized representation 750 (e.g., based on the end user clicking on a portion of the miniaturized representation 750), the view manager 204 may cause the user interface 202 to cease presenting (or cease the focus of presentation for) the single-module view 600 of FIG. 7, and to return to presenting (or return the focus of presentation to) the multi-module view 400 of FIG. 5.

Flowcharts representative of example methods for implementing the example multi-module process control management system 200 of FIGS. 2-3 are shown in FIGS. 8-12. In these examples, the methods may be implemented using machine-readable instructions that comprise one or more program(s) for execution by a processor such as the processor 1312 shown in the example processor platform 1300 discussed below in connection with FIG. 13. The one or more program(s) may be embodied in software stored on a tangible computer readable storage medium such as a CD-ROM, a floppy disk, a hard drive, a digital versatile disk (DVD), a Blu-ray disk, or a memory associated with the processor 1312, but the entire program(s) and/or parts thereof could alternatively be executed by a device other than the processor 1312 and/or embodied in firmware or dedicated hardware. Further, although the example program(s) is/are described with reference to the flowcharts illustrated in FIGS. 8-12, many other methods of implementing the example multi-module process control management system 200 may alternatively be used. For example, the order of execution of the blocks may be changed, and/or some of the blocks described may be changed, eliminated, or combined.

As mentioned above, the example methods of FIGS. 8-12 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 8-12 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 8:
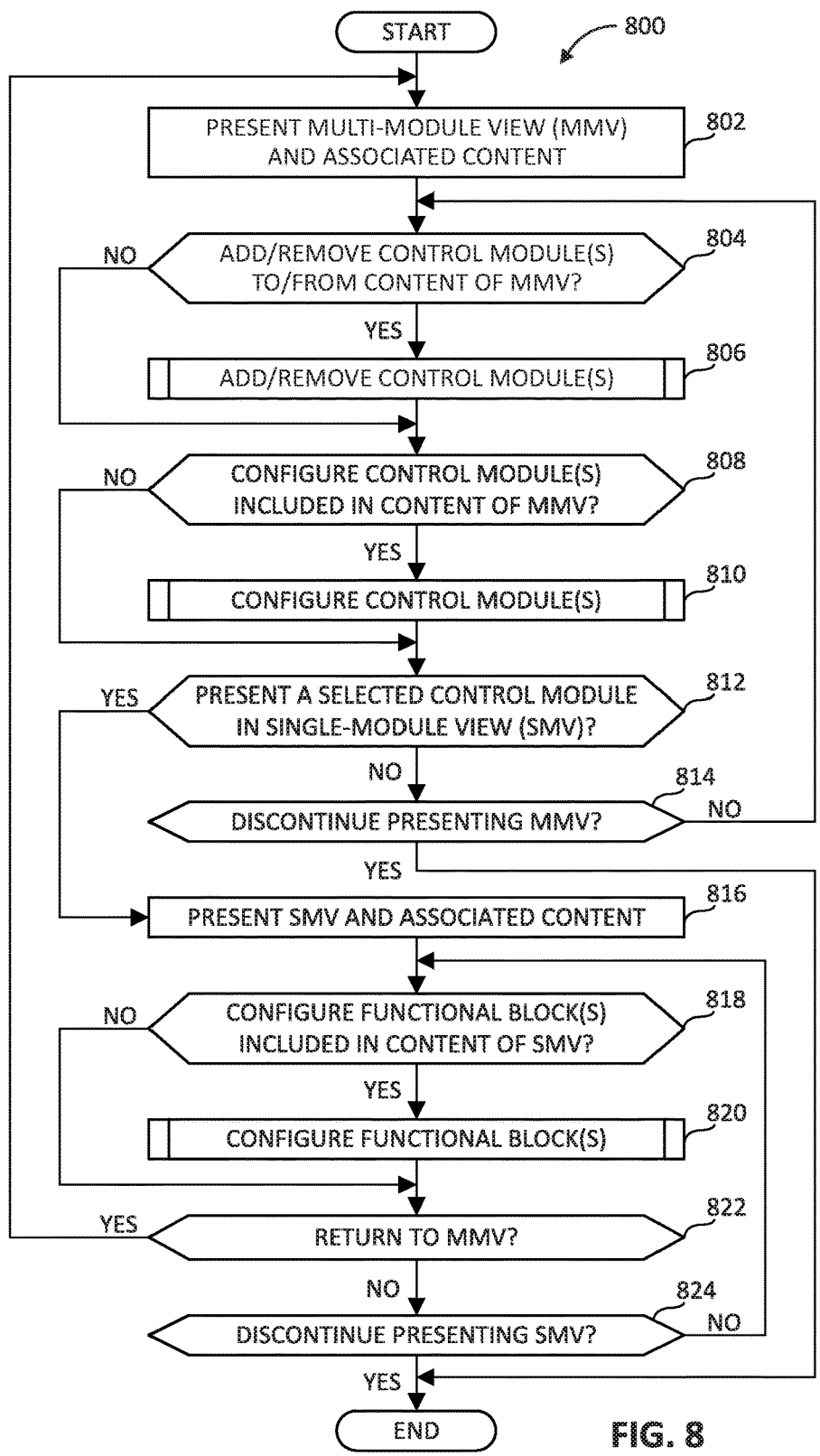
FIG. 8 is a flowchart representative of an example method that may be used to implement the example multi-module process control management system of FIGS. 2-3 to design, construct, generate, edit and/or configure a process control strategy.

FIG. 8 is a flowchart representative of an example method 800 that may be executed to implement the example multi-module process control management system 200 of FIGS. 2-3 to design, construct, generate, edit, configure, test, and/or debug a process control strategy and/or the running logic associated therewith. The example method 800 of FIG. 8 begins when the user interface 202 of FIG. 2 presents a multi-module view and any content associated therewith (block 802). For example, the user interface 202 may present the example multi-module view 400 having the associated content (e.g., the example control modules 402, 404, 406, 408, 410, 412 along with the module inputs and module outputs corresponding thereto) illustrated in FIG. 4. In some examples, the user interface 202 may present a multi-module view that does not yet include any associated content (e.g., a multi-module view for which the control module developer 206 of FIG. 2 has not yet generated any of the control modules 402, 404, 406, 408, 410, 412 included in FIG. 4).

The view manager 204 of FIG. 2 determines whether an input or other indication has been received via the user interface 202 of FIG. 2 indicating that one or more control module(s) is to be added or removed relative to the current content of the multi-module view presented via the user interface 202 (block 804). For example, based on an input or other indication received via the user interface 202, the view manager 204 may determine that one or more control module(s) is to be generated for inclusion in the multi-module view 400 of FIG. 4. If the view manager 204 determines at block 804 that an input or other indication has been received indicating that one or more control module(s) is to be added or removed relative to the current content of the multi-module view presented via the user interface 202, control of the example method 800 proceeds to block 806. If the view manager 204 instead determines at block 804 that such an input or other indication has not been received, control of the example method 800 proceeds to block 808.

At block 806, the control module developer 206 of FIG. 2 generates one or more control module(s) to be included in the current content of the multi-module view presented via the user interface 202 and/or removes one or more control module(s) from the current content of the multi-module view presented via the user interface 202 (block 806). For example, the control module developer 206 may generate the control modules 402, 404, 406, 408, 410, 412 included in the example multi-module view 400 as shown in FIG. 4. As another example, the control module developer 206 may remove one or more of the control modules 402, 404, 406, 408, 410, 412 included in the example multi-module view 400 as shown in FIG. 4. An example process that may be used to implement block 806 to generate and/or add one or more control module(s) to the current content of the multi-module view presented via the user interface is described in greater detail below in connection with FIG. 9. An example process that may be used to implement block 806 to remove one or more control module(s) from the current content of the multi-module view presented via the user interface is described in greater detail below in connection with FIG. 10.

At block 808, the view manager 204 of FIG. 2 determines whether an input or other indication has been received via the user interface 202 of FIG. 2 indicating that one or more control module(s) included in the current content of the multi-module view presented via the user interface 202 is to be configured and/or reconfigured (block 808). For example, based on an input or other indication received via the user interface 202, the view manager 204 may determine that one or more of the example control modules 402, 404, 406, 408, 410, 412 included in the example multi-module view 400 as shown in FIG. 4 is to be configured and/or reconfigured. If the view manager 204 determines at block 808 that an input or other indication has been received indicating that one or more control module(s) included in the current content of the multi-module view presented via the user interface 202 is to be configured and/or reconfigured, control of the example method 800 proceeds to block 810. If the view manager 204 instead determines at block 808 that such an input or other indication has not been received, control of the example method 800 proceeds to block 812.

At block 810, the configuration manager 210 of FIG. 2 configures and/or reconfigures one or more of the control module(s) included in the current content of the multi-module view presented via the user interface 202 (block 810). For example, with respect to the control modules 402, 404, 406, 408, 410, 412 included in the multi-module view 400 as shown in FIG. 4, the configuration manger 210 may configure and/or reconfigure one or more corresponding module input(s) of the control module(s), one or more corresponding module output(s) of the control module(s), one or more logical connection(s) between the control modules, a rate of execution of the control module(s), and/or an order of execution for the control modules. An example process that may be used to implement block 810 is described in greater detail below in connection with FIG. 11.

At block 812, the view manager 204 of FIG. 2 determines whether a module selection input or other indication has been received via the user interface 202 of FIG. 2 indicating that one of the control modules selected from among the control modules included in the current content of the multi-module view presented via the user interface 202 is to be presented in a single-module view via the user interface 202 (block 812). For example, based on an input or other indication received via the user interface 202, the view manager 204 may determine that one or more of the control modules 402, 404, 406, 408, 410, 412 included in the example multi-module view 400 as shown in FIG. 4 is to be presented in a single-module view via the user interface 202. If the view manager 204 determines at block 812 that a module selection input or other indication has been received indicating that one of the control modules selected from among the control modules included in the current content of the multi-module view presented via the user interface 202 is to be presented in a single-module view via the user interface 202, control of the example method 800 proceeds to block 816. If the view manager 204 instead determines at block 812 that such an input or other indication has not been received, control of the example method 800) proceeds to block 814.

At block 814, the view manager 204 of FIG. 2 determines whether an input or other indication has been received via the user interface 202 of FIG. 2 indicating that the user interface 202 should discontinue presenting the currently-presented multi-module view (block 814). For example, based on an input or other indication received via the user interface 202, the view manager 204 may determine that the user interface 202 should discontinue presenting the example multi-module view 400 as shown in either of FIG. 4 or 5. If the view manager 204 determines at block 814 that an input or other indication has been received indicating that the user interface 202 should discontinue presenting the currently-presented multi-module view, the example method 800 ends. If the view manager 204 instead determines at block 814 that such an input or other indication has not been received, control of the example method 800 returns to block 804.

At block 816, the user interface 202 of FIG. 2 presents a single-module view including content corresponding to and/or associated with the selected one of the control modules (block 816). For example, the user interface 202 may present the example single-module view 600 having the associated content (e.g., the example function blocks 602, 604 along with the block inputs, block outputs and logical connections corresponding thereto) illustrated in FIG. 6.

At block 818, the view manager 204 of FIG. 2 determines whether an input or other indication has been received via the user interface 202 of FIG. 2 indicating that one or more functional block(s) included in the current content of the single-module view presented via the user interface 202 is to be configured and/or reconfigured (block 818). For example, based on an input or other indication received via the user interface 202, the view manager 204 may determine that one or more of the functional blocks 602, 604 included in the example single-module view 600 as shown in FIG. 6 is to be configured and/or reconfigured. If the view manager 204 determines at block 818 that an input or other indication has been received indicating that one or more functional block(s) included in the current content of the single-module view presented via the user interface 202 is to be configured and/or reconfigured, control of the example method 800 proceeds to block 820. If the view manager 204 instead determines at block 818 that such an input or other indication has not been received, control of the example method 800 proceeds to block 822.

At block 820, the configuration manager 210 of FIG. 2 configures and/or reconfigures one or more of the functional block(s) included in the current content of the single-module view presented via the user interface 202 (block 820). For example, with respect to the functional blocks 602, 604 included in the example single-module view 600 as shown in FIG. 6, the configuration manger 210 may configure and/or reconfigure one or more corresponding block input(s) of the functional block(s), one or more corresponding block output(s) of the functional block(s), one or more logical connection(s) between the functional blocks, and/or one or more logical connection(s) between a respective one of the functional blocks and a respective one of the control modules included within the multi-module view 400 with which the example single-module view 600 is associated. An example process that may be used to implement block 820 is described in greater detail below in connection with FIG. 12.

At block 822, the view manager 204 of FIG. 2 determines whether an input or other indication has been received via the user interface 202 of FIG. 2 indicating that the user interface 202 should return to presenting a multi-module view (block 822). For example, based on an input or other indication received via the user interface 202, the view manager 204 may determine that the user interface 202 should discontinue presenting the example single-module view 600 as shown in either of FIG. 6 or 7 and return to presenting the example multi-module view 400 of either of FIG. 4 or 5. If the view manager 204 determines at block 822 that an input or other indication has been received indicating that the user interface 202 should return to presenting a multi-module view, control of the example method 800 returns to block 802. If the view manager 204 instead determines at block 822 that such an input or other indication has not been received, control of the example method 800 proceeds to block 824.

At block 824, the view manager 204 of FIG. 2 determines whether an input or other indication has been received via the user interface 202 of FIG. 2 indicating that the user interface 202 should discontinue presenting the currently-presented single-module view (block 824). For example, based on an input or other indication received via the user interface 202, the view manager 204 may determine that the user interface 202 should discontinue presenting the example single-module view 600 as shown in either of FIG. 6 or 7. If the view manager 204 determines at block 824 that an input or other indication has been received indicating that the user interface 202 should discontinue presenting the currently-presented single-module view, the example method 800 ends. If the view manager 204 instead determines at block 824 that such an input or other indication has not been received, control of the example method 800 returns to block 818.

Figure 9:
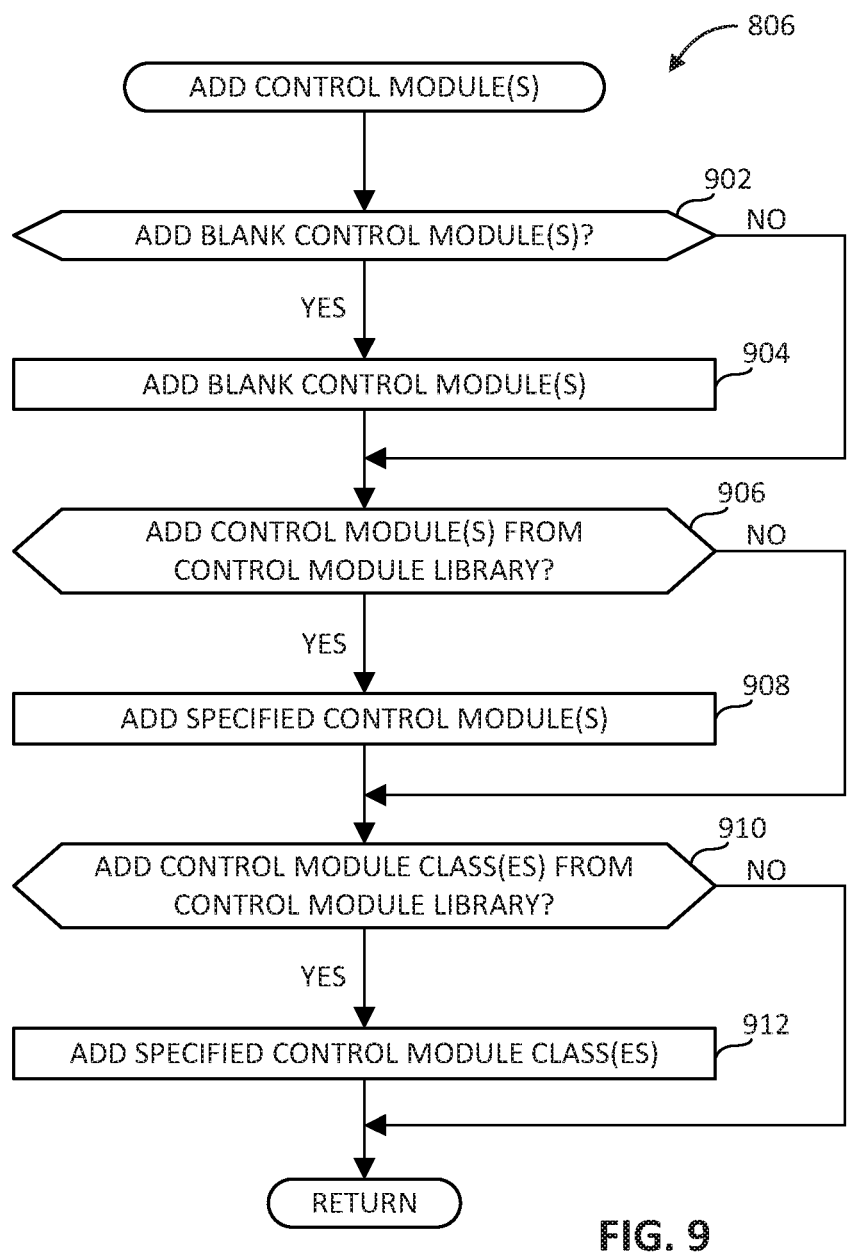
FIG. 9 is a flowchart representative of an example method that may be used to implement the example control module developer of FIG. 2 to generate one or more control module(s) to be presented in a multi-module view.

FIG. 9 is a flowchart representative of an example method 806 that may be executed to implement the example control module developer 206 of FIG. 2 to generate one or more control module(s) to be included in and/or added to the current content of the multi-module view presented via the example user interface 202 of FIG. 2. Example operations of blocks 902, 904, 906, 908, 910 and 912 of FIG. 9 may be used to implement block 806 of FIG. 8.

The example method 806 of FIG. 9 begins when the control module developer 206 of FIG. 2 determines whether an input or other indication has been received via the user interface 202 of FIG. 2 indicating that one or more blank control module(s) is to be generated for inclusion in and/or added to the multi-module view (block 902).

For example, based on an input or other indication received via the user interface 202, the control module developer 206 may determine that one or more blank control module(s) is to be generated for inclusion in and/or added to the example multi-module view 400 of FIG. 4. If the control module developer 206 determines at block 902 that an input or other indication has been received indicating that one or more blank control module(s) is to be generated for inclusion in and/or added to the multi-module view, control of the example method 806 proceeds to block 904. If the control module developer 206 instead determines at block 902 that such an input or other indication has not been received, control of the example method 806 proceeds to block 906.

At block 904, the control module developer 206 of FIG. 2 generates one or more blank control module(s) to be included in and/or added to the current content of the multi-module view presented via the user interface 202 of FIG. 2 (block 904). For example, one or more of the control modules 402, 404, 406, 408, 410, 412 included in the example multi-module view 400 as shown in FIG. 4 may have initially been generated by the control module developer 206 as a blank control module.

At block 906, the control module developer 206 of FIG. 2 determines whether an input or other indication has been received via the user interface 202 of FIG. 2 indicating that one or more preconfigured control module(s) is to be generated for inclusion in and/or added to the multi-module view by retrieving the preconfigured control module(s) from a control module library (block 906). For example, based on an input or other indication received via the user interface 202, the control module developer 206 may determine that one or more preconfigured control module(s) is to be generated for inclusion in and/or added to the example multi-module view 400 of FIG. 4 by selecting and/or retrieving such preconfigured control module(s) from the control module library 208 of FIG. 2. If the control module developer 206 determines at block 906 that an input or other indication has been received indicating that one or more preconfigured control module(s) is to be generated for inclusion in and/or added to the multi-module view by retrieving the preconfigured control module(s) from a control module library, control of the example method 806 proceeds to block 908. If the control module developer 206 instead determines at block 906 that such an input or other indication has not been received, control of the example method 806 proceeds to block 910.

At block 908, the control module developer 206 of FIG. 2 generates one or more preconfigured control module(s) to be included in and/or added to the current content of the multi-module view by retrieving one or more specified preconfigured control module(s) from a control module library (block 908). For example, one or more of the control modules 402, 404, 406, 408, 410, 412 included in the example multi-module view 400 as shown in FIG. 4 may have been generated by the control module developer 206 selecting and/or retrieving one or more specified preconfigured control module(s) from the control module library 208 of FIG. 2.

At block 910, the control module developer 206 of FIG. 2 determines whether an input or other indication has been received via the user interface 202 of FIG. 2 indicating that one or more preconfigured control module class(es) is to be generated for inclusion in and/or added to the multi-module view by retrieving the preconfigured control module class(es) from a control module library (block 910). For example, based on an input or other indication received via the user interface 202, the control module developer 206 may determine that one or more preconfigured control module class(es) is to be generated for inclusion in and/or added to the example multi-module view 400 of FIG. 4 by selecting and/or retrieving such preconfigured control module class(es) from the control module library 208 of FIG. 2. If the control module developer 206 determines at block 906 that an input or other indication has been received indicating that one or more preconfigured control module class(es) is to be generated for inclusion in and/or added to the multi-module view by retrieving the preconfigured control module class(es) from a control module library, control of the example method 806 proceeds to block 912. If the control module developer 206 instead determines at block 910 that such an input or other indication has not been received, the example method 806 ends and control returns to a calling function or process such as the example method 800 of FIG. 8.

At block 912, the control module developer 206 of FIG. 2 generates one or more preconfigured control module class(es) to be included in and/or added to the current content of the multi-module view by retrieving one or more specified control module class(es) from a control module library (block 912). For example, one or more of the control modules 402, 404, 406, 408, 410, 412 included in the example multi-module view 400 as shown in FIG. 4 may have been generated by the control module developer 206 selecting and/or retrieving one or more specified preconfigured control module class(es) from the control module library 208 of FIG. 2. Following block 912, the example method 806 ends and control returns to a calling function or process such as the example method 800 of FIG. 8.

Figure 10:
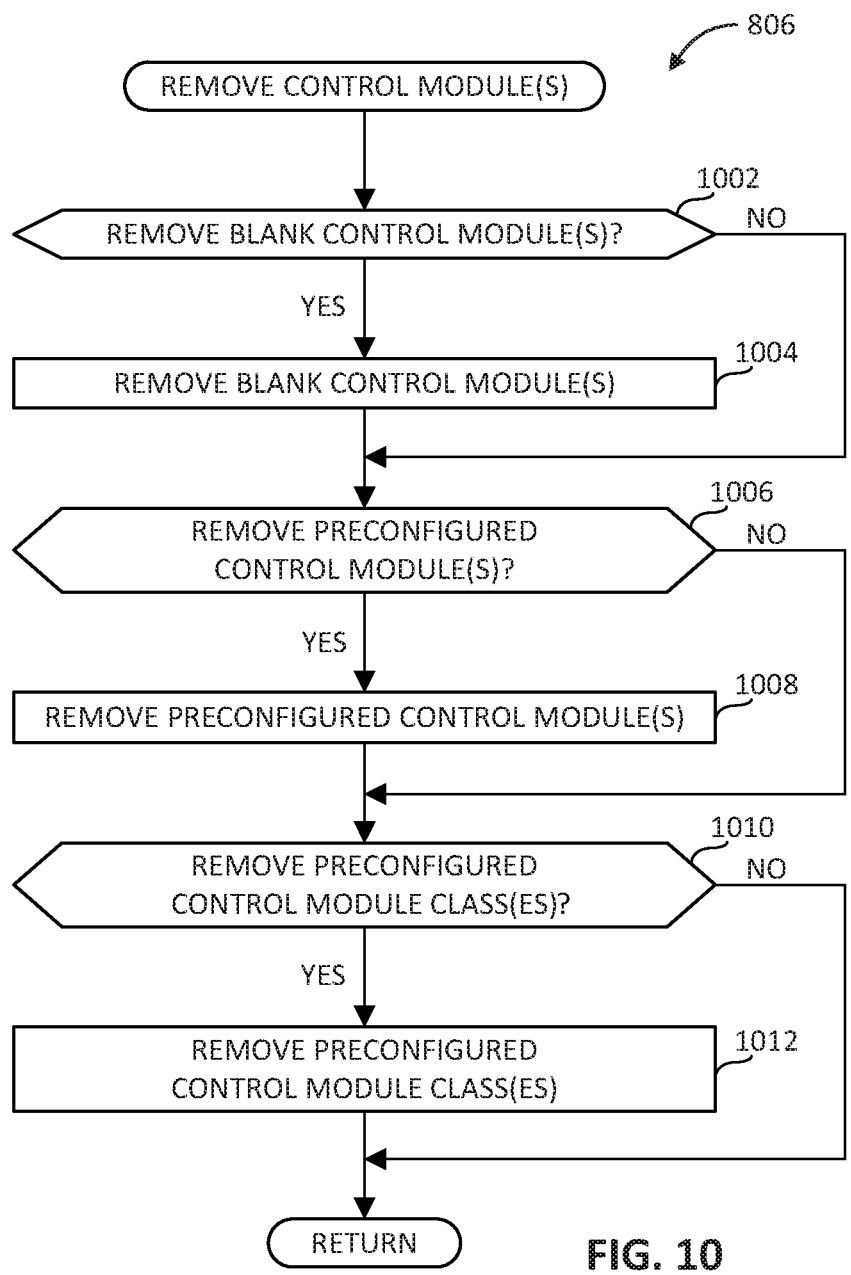
FIG. 10 is a flowchart representative of an example method that may be used to implement the example control module developer of FIG. 2 to remove one or more control module(s) presented in a multi-module view.

FIG. 10 is a flowchart representative of an example method 806 that may be executed to implement the example control module developer 206 of FIG. 2 to remove one or more control module(s) from the multi-module view presented via the example user interface 202 of FIG. 2. Example operations of blocks 1002, 1004, 1006, 1008, 1010 and 1012 of FIG. 10 may be used to implement block 806 of FIG. 8.

The example method 806 of FIG. 10 begins when the control module developer 206 of FIG. 2 determines whether an input or other indication has been received via the user interface 202 of FIG. 2 indicating that one or more blank control module(s) is to be removed from the multi-module view (block 1002). For example, based on an input or other indication received via the user interface 202, the control module developer 206 may determine that one or more blank control module(s) is to be removed from the example multi-module view 400 of FIG. 4. If the control module developer 206 determines at block 1002 that an input or other indication has been received indicating that one or more blank control module(s) is to be removed from the multi-module view, control of the example method 806 proceeds to block 1004. If the control module developer 206 instead determines at block 1002 that such an input or other indication has not been received, control of the example method 806 proceeds to block 1006.

At block 1004, the control module developer 206 of FIG. 2 removes one or more blank control module(s) from the current content of the multi-module view presented via the user interface 202 of FIG. 2 (block 1004).

At block 1006, the control module developer 206 of FIG. 2 determines whether an input or other indication has been received via the user interface 202 of FIG. 2 indicating that one or more preconfigured control module(s) is to be removed from the multi-module view (block 1006). For example, based on an input or other indication received via the user interface 202, the control module developer 206 may determine that one or more preconfigured control module(s) is to be removed from the example multi-module view 400 of FIG. 4. If the control module developer 206 determines at block 1006 that an input or other indication has been received indicating that one or more preconfigured control module(s) is to be removed from the multi-module view, control of the example method 806 proceeds to block 1008. If the control module developer 206 instead determines at block 1006 that such an input or other indication has not been received, control of the example method 806 proceeds to block 1010.

At block 1008, the control module developer 206 of FIG. 2 removes one or more preconfigured control module(s) from the current content of the multi-module view presented via the user interface 202 of FIG. 2 (block 1008).

At block 1010, the control module developer 206 of FIG. 2 determines whether an input or other indication has been received via the user interface 202 of FIG. 2 indicating that one or more preconfigured control module class(es) is to be removed from the multi-module view (block 1010). For example, based on an input or other indication received via the user interface 202, the control module developer 206 may determine that one or more preconfigured control module class(es) is to be removed from the example multi-module view 400 of FIG. 4. If the control module developer 206 determines at block 1010 that an input or other indication has been received indicating that one or more preconfigured control module class(es) is to be removed from the multi-module view, control of the example method 806 proceeds to block 1012. If the control module developer 206 instead determines at block 1010 that such an input or other indication has not been received, the example method 806 ends and control returns to a calling function or process such as the example method 800 of FIG. 8.

At block 1012, the control module developer 206 of FIG. 2 removes one or more preconfigured control module class(es) from the current content of the multi-module view presented via the user interface 202 of FIG. 2 (block 1012). Following block 1012, the example method 806 ends and control returns to a calling function or process such as the example method 800 of FIG. 8.

Figure 11:
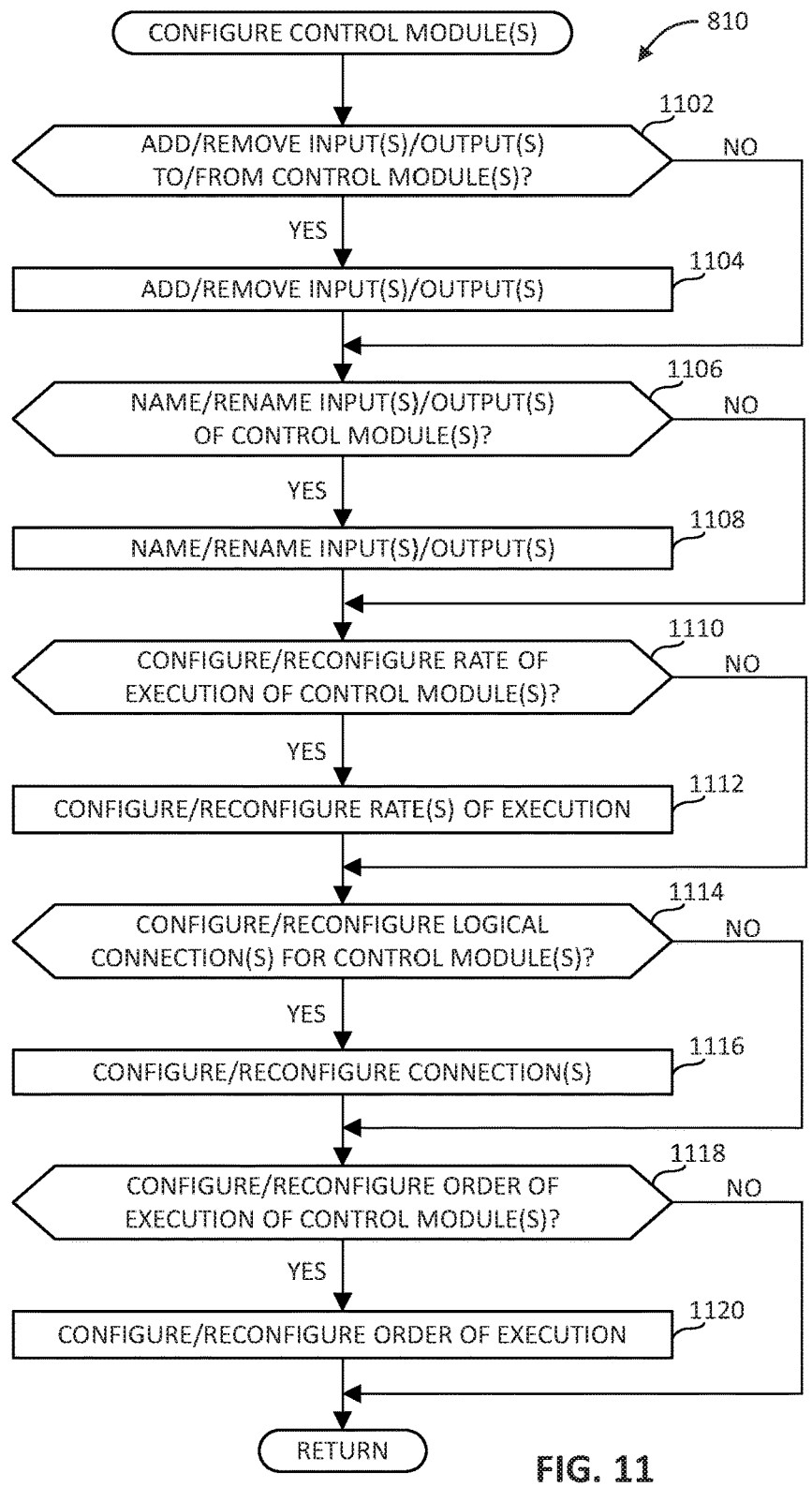
FIG. 11 is a flowchart representative of an example method that may be used to implement the example configuration manager of FIGS. 2-3 to configure and/or reconfigure one or more control module(s) presented in a multi-module view.

FIG. 11 is a flowchart representative of an example method 810 that may be executed to implement the example configuration manager 210 of FIGS. 2-3 to configure and/or reconfigure one or more of the control module(s) included in the current content of the multi-module view presented via the example user interface 202 of FIG. 2. Example operations of blocks 1102, 1104, 1106, 1108, 1110, 1112, 1114, 1116, 1118 and 1120 of FIG. 11 may be used to implement block 810 of FIG. 8.

The example method 810 of FIG. 11 begins when the configuration manger 210 of FIG. 2 determines whether an input or other indication has been received via the user interface 202 of FIG. 2 indicating that one or more module input(s) and/or one or more module output(s) corresponding to one or more of the control module(s) included in the current content of the multi-module view is to be added and/or removed (block 1102). For example, based on an input or other indication received via the user interface 202, the configuration manager 210 may determine that one or more module input(s) and/or one or more module output(s) corresponding to one or more of the control module(s) 402, 404, 406, 408, 410, 412 of the example multi-module view 400 shown in FIG. 4 is to be added and/or removed. If the configuration manager 210 determines at block 1102 that an input or other indication has been received indicating that one or more module input(s) and/or one or more module output(s) corresponding to one or more of the control module(s) included in the current content of the multi-module view is to be added and/or removed, control of the example method 810 proceeds to block 1104. If the configuration manager 210 instead determines at block 1102 that such an input or other indication has not been received, control of the example method 810 proceeds to block 1106.

At block 1104, the configuration manager 210 of FIG. 2, via the module editor 302 of FIG. 3, adds and/or removes one or more module input(s) and/or one or more module output(s) corresponding to one or more of the control module(s) included in the current content of the multi-module view presented via the user interface 202 of FIG. 2

(block 1104). For example, the configuration manager 210, via the module editor 302, may add and/or remove one or more module input(s) and/or one or more module output(s) corresponding to one or more of the control module(s) 402, 404, 406, 408, 410, 412 of the example multi-module view 400 shown in FIG. 4.

At block 1106, the configuration manger 210 of FIG. 2 determines whether an input or other indication has been received via the user interface 202 of FIG. 2 indicating that one or more module input(s) and/or one or more module output(s) corresponding to one or more of the control module(s) included in the current content of the multi-module view is to be named and/or renamed (block 1106). For example, based on an input or other indication received via the user interface 202, the configuration manager 210 may determine that one or more module input(s) and/or one or more module output(s) corresponding to one or more of the control module(s) 402, 404, 406, 408, 410, 412 of the example multi-module view 400 shown in FIG. 4 is to be named and/or renamed. If the configuration manager 210 determines at block 1106 that an input or other indication has been received indicating that one or more module input(s) and/or one or more module output(s) corresponding to one or more of the control module(s) included in the current content of the multi-module view is to be named and/or renamed, control of the example method 810 proceeds to block 1108. If the configuration manager 210 instead determines at block 1106 that such an input or other indication has not been received, control of the example method 810 proceeds to block 1110.

At block 1108, the configuration manager 210 of FIG. 2, via the module editor 302 of FIG. 3, names and/or renames one or more module input(s) and/or one or more module output(s) corresponding to one or more of the control module(s) included in the current content of the multi-module view presented via the user interface 202 of FIG. 2 (block 1108). For example, the configuration manager 210, via the module editor 302, may name and/or rename one or more module input(s) and/or one or more module output(s) corresponding to one or more of the control module(s) 402, 404, 406, 408, 410, 412 of the example multi-module view 400 shown in FIG. 4.

At block 1110, the configuration manger 210 of FIG. 2 determines whether an input or other indication has been received via the user interface 202 of FIG. 2 indicating that a rate of execution corresponding to one or more of the control module(s) included in the current content of the multi-module view is to be configured and/or reconfigured (block 1110). For example, based on an input or other indication received via the user interface 202, the configuration manager 210 may determine that a rate of execution corresponding to one or more of the control module(s) 402, 404, 406, 408, 410, 412 of the example multi-module view 400 shown in FIG. 4 is to be configured and/or reconfigured. If the configuration manager 210 determines at block 1110 that an input or other indication has been received indicating that a rate of execution corresponding to one or more of the control module(s) included in the current content of the multi-module view is to be configured and/or reconfigured, control of the example method 810 proceeds to block 1112. If the configuration manager 210 instead determines at block 1110 that such an input or other indication has not been received, control of the example method 810 proceeds to block 1114.

At block 1112, the configuration manager 210 of FIG. 2, via the module editor 302 of FIG. 3, configures and/or reconfigures a rate of execution corresponding to one or more of the control module(s) included in the current content of the multi-module view presented via the user interface 202 of FIG. 2 (block 1112). For example, the configuration manager 210, via the module editor 302, may configure and/or reconfigure a rate of execution corresponding to one or more of the control module(s) 402, 404, 406, 408, 410, 412 of the example multi-module view 400 shown in FIG. 4.

At block 1114, the configuration manger 210 of FIG. 2 determines whether an input or other indication has been received via the user interface 202 of FIG. 2 indicating that one or more logical connection(s) is to be configured and/or reconfigured for the current content of the multi-module view presented via the user interface 202 (block 1114). For example, based on an input or other indication received via the user interface 202, the configuration manager 210 may determine that one or more logical connection(s) is to be configured and/or reconfigured between respective ones of the control module(s) 402, 404, 406, 408, 410, 412 of the example multi-module view 400 shown in FIG. 4. If the configuration manager 210 determines at block 1114 that such an input or other indication has been received indicating that one or more logical connection(s) is to be configured and/or reconfigured for the current content of the multi-module view presented via the user interface 202, control of the example method 810 proceeds to block 1116. If the configuration manager 210 instead determines at block 1114 that such an input or other indication has not been received, control of the example method 810 proceeds to block 1118.

At block 1116, the configuration manager 210 of FIG. 2, via the module connection manager 304 of FIG. 3, configures and/or reconfigures one or more logical connection(s) between respective ones of the control modules via corresponding ones of the module inputs and corresponding ones of the module outputs included in the current content of the multi-module view presented via the user interface 202 of FIG. 2 (block 1116). For example, the configuration manager 210, via the module connection manager 304, may configure and/or reconfigure one or more logical connection(s) between respective ones of the control modules 402, 404, 406, 408, 410, 412 of the example multi-module view 400 shown in FIG. 4 via corresponding ones of the module inputs and corresponding ones of the module outputs included in the control module(s) 402, 404, 406, 408, 410, 412.

At block 1118, the configuration manger 210 of FIG. 2 determines whether an input or other indication has been received via the user interface 202 of FIG. 2 indicating that an order of execution of one or more of the control module(s) included in the current content of the multi-module view presented via the user interface 202 is to be is to be configured and/or reconfigured (block 1118). For example, based on an input or other indication received via the user interface 202, the configuration manager 210 may determine that an order of execution of one or more of the control module(s) 402, 404, 406, 408, 410, 412 of the example multi-module view 400 shown in FIG. 4 is to be configured and/or reconfigured. If the configuration manager 210 determines at block 1118 that an input or other indication has been received indicating that an order of execution of one or more of the control module(s) included in the current content of the multi-module view presented via the user interface 202 is to be is to be configured and/or reconfigured, control of the example method 810 proceeds to block 1120. If the configuration manager 210 instead determines at block 1118 that such an input or other indication has not been received, control of the example method 810 ends and control returns to a calling function or process such as the example method 800 of FIG. 8.

At block 1120, the configuration manager 210 of FIG. 2, via the module execution manager 306 of FIG. 3, configures and/or reconfigures an order of execution of one or more of the control module(s) included in the current content of the multi-module view presented via the user interface 202 of FIG. 2 (block 1120). For example, the configuration manager 210, via the module execution manager 306, may configure and/or reconfigure an order of execution of one or more of the control module(s) 402, 404, 406, 408, 410, 412 of the example multi-module view 400 shown in FIG. 4. Following block 1120, the example method 810 ends and control returns to a calling function or process such as the example method 800 of FIG. 8.

Figure 12:
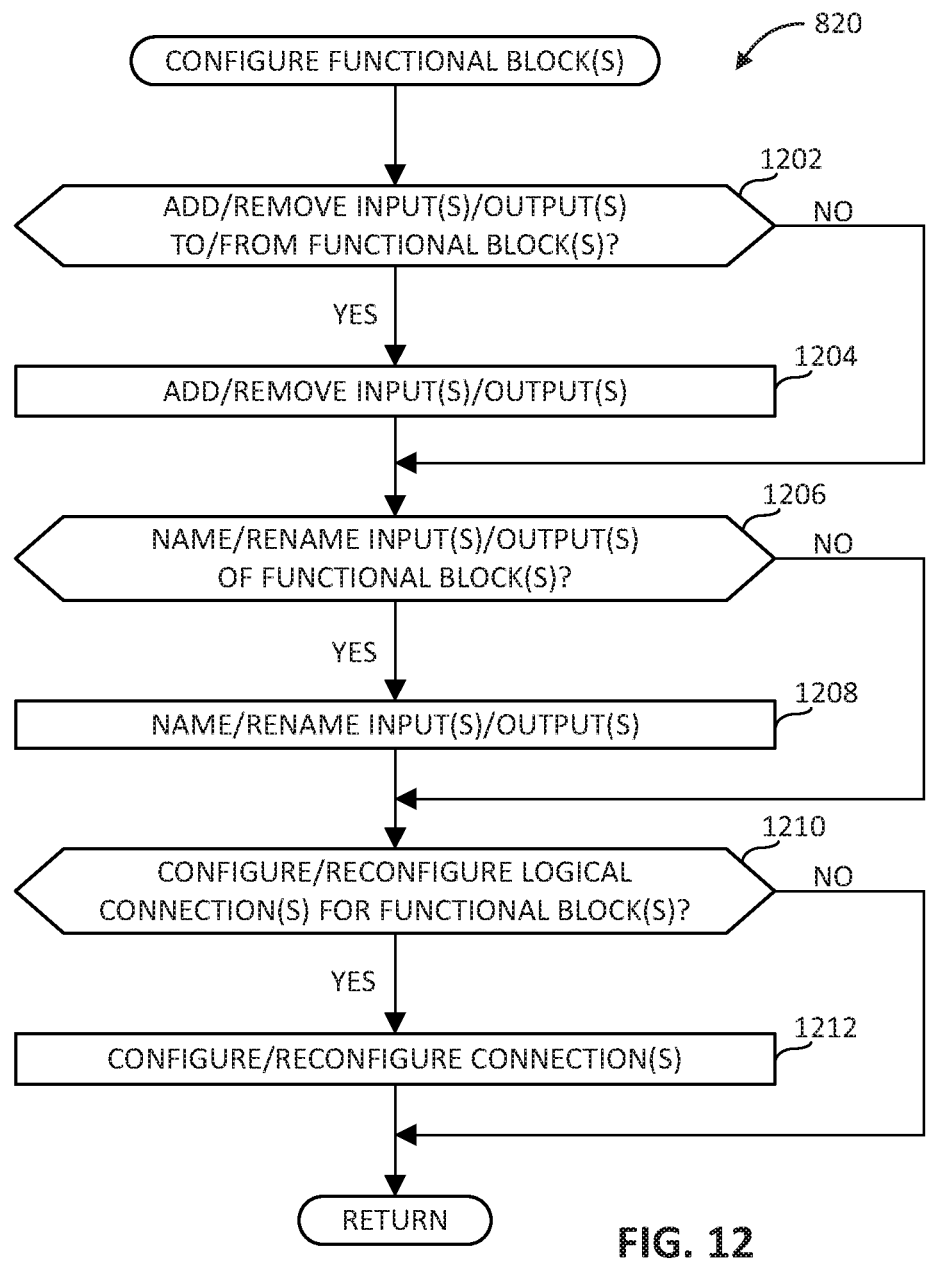
FIG. 12 is a flowchart representative of an example method that may be used to implement the example configuration manager of FIGS. 2-3 to configure and/or reconfigure one or more functional block(s) presented in a single-module view.

FIG. 12 is a flowchart representative of an example method 820 that may be executed to implement the example configuration manager 210 of FIGS. 2-3 to configure and/or reconfigure one or more of the functional block(s) included in the current content of the single-module view presented via the example user interface 202 of FIG. 2. Example operations of blocks 1202, 1204, 1206, 1208, 1210 and 1212 of FIG. 12 may be used to implement block 820 of FIG. 8.

The example method 820 of FIG. 12 begins when the configuration manger 210 of FIG. 2 determines whether an input or other indication has been received via the user interface 202 of FIG. 2 indicating that one or more block input(s) and/or one or more block output(s) corresponding to one or more of the functional block(s) included in the current content of the single-module view is to be added and/or removed (block 1202). For example, based on an input or other indication received via the user interface 202, the configuration manager 210 may determine that one or more block input(s) and/or one or more block output(s) corresponding to one or more of the functional block(s) 602, 604 of the example single-module view 600 shown in FIG. 6 is to be added and/or removed. If the configuration manager 210 determines at block 1202 that an input or other indication has been received indicating that one or more block input(s) and/or one or more block output(s) corresponding to one or more of the functional block(s) included in the current content of the single-module view is to be added and/or removed, control of the example method 820 proceeds to block 1204. If the configuration manager 210 instead determines at block 1202 that such an input or other indication has not been received, control of the example method 820 proceeds to block 1206.

At block 1204, the configuration manager 210 of FIG. 2, via the block editor 308 of FIG. 3, adds and/or removes one or more block input(s) and/or one or more block output(s) corresponding to one or more of the functional block(s) included in the current content of the single-module view presented via the user interface 202 of FIG. 2 (block 1204). For example, the configuration manager 210, via the block editor 308, may add and/or remove one or more block input(s) and/or one or more block output(s) corresponding to one or more of the functional block(s) 602, 604 of the example single-module view 600 shown in FIG. 6.

At block 1206, the configuration manger 210 of FIG. 2 determines whether an input or other indication has been received via the user interface 202 of FIG. 2 indicating that one or more block input(s) and/or one or more block output(s) corresponding to one or more of the functional block(s) included in the current content of the single-module view is to be named and/or renamed (block 1206). For example, based on an input or other indication received via the user interface 202, the configuration manager 210 may determine that one or more block input(s) and/or one or more block output(s) corresponding to one or more of the functional block(s) 602, 604 of the example single-module view 600 shown in FIG. 6 is to be named and/or renamed. If the configuration manager 210 determines at block 1206 that an input or other indication has been received indicating that one or more block input(s) and/or one or more block output(s) corresponding to one or more of the functional block(s) included in the current content of the single-module view is to be named and/or renamed, control of the example method 820 proceeds to block 1208. If the configuration manager 210 instead determines at block 1206 that such an input or other indication has not been received, control of the example method 820 proceeds to block 1210.

At block 1208, the configuration manager 210 of FIG. 2, via the block editor 308 of FIG. 3, names and/or renames one or more block input(s) and/or one or more block output(s) corresponding to one or more of the functional block(s) included in the current content of the single-module view presented via the user interface 202 of FIG. 2 (block 1208). For example, the configuration manager 210, via the block editor 308, may name and/or rename one or more block input(s) and/or one or more block output(s) corresponding to one or more of the functional block(s) 602, 604 of the example single-module view 600 shown in FIG. 6.

At block 1210, the configuration manger 210 of FIG. 2 determines whether an input or other indication has been received via the user interface 202 of FIG. 2 indicating that one or more logical connection(s) is to be configured and/or reconfigured for the current content of the single-module view presented via the user interface 202 of FIG. 2 (block 1210). For example, based on an input or other indication received via the user interface 202, the configuration manager 210 may determine that one or more logical connection(s) is to be configured and/or reconfigured between respective ones of the functional block(s) 602, 604, and/or between respective ones of the functional blocks 602, 604 and respective ones of the control modules 402, 404, 406, 408, 410, 412, via corresponding ones of the block inputs, corresponding ones of the block outputs, corresponding ones of the module inputs and/or corresponding ones of the module outputs included in the example single-module view 600 shown in FIG. 6. If the configuration manager 210 determines at block 1210 that such an input or other indication has been received indicating that one or more logical connection(s) is to be configured and/or reconfigured for the current content of the single-module view presented via the user interface 202, control of the example method 820 proceeds to block 1212. If the configuration manager 210 instead determines at block 1210 that such an input or other indication has not been received, the example method 820 ends and control returns to a calling function or process such as the example method 800 of FIG. 8.

At block 1212, the configuration manager 210 of FIG. 2, via the block connection manager 310 of FIG. 3, configures and/or reconfigures one or more logical connection(s) between respective ones of the functional blocks and/or between respective ones of the functional blocks and respective ones of the control modules via corresponding ones of the block inputs, corresponding ones of the block outputs, corresponding ones of the module inputs and/or corresponding ones of the module outputs included in the current content of the single-module view presented via the user interface 202 of FIG. 2 (block 1212). For example, the configuration manager 210, via the block connection manager 310, may configure and/or reconfigure one or more logical connection(s) between respective ones of the functional block(s) 602, 604, and/or between respective ones of the functional blocks 602, 604 and respective ones of the control modules 402, 404, 406, 408, 410, 412, via corresponding ones of the block inputs, corresponding ones of the block outputs, corresponding ones of the module inputs and/or corresponding ones of the module outputs included in the example single-module view 600 shown in FIG. 6. Following block 1212, the example method 820 ends and control returns to a calling function or process such as the example method 800 of FIG. 8.

Figure 13:
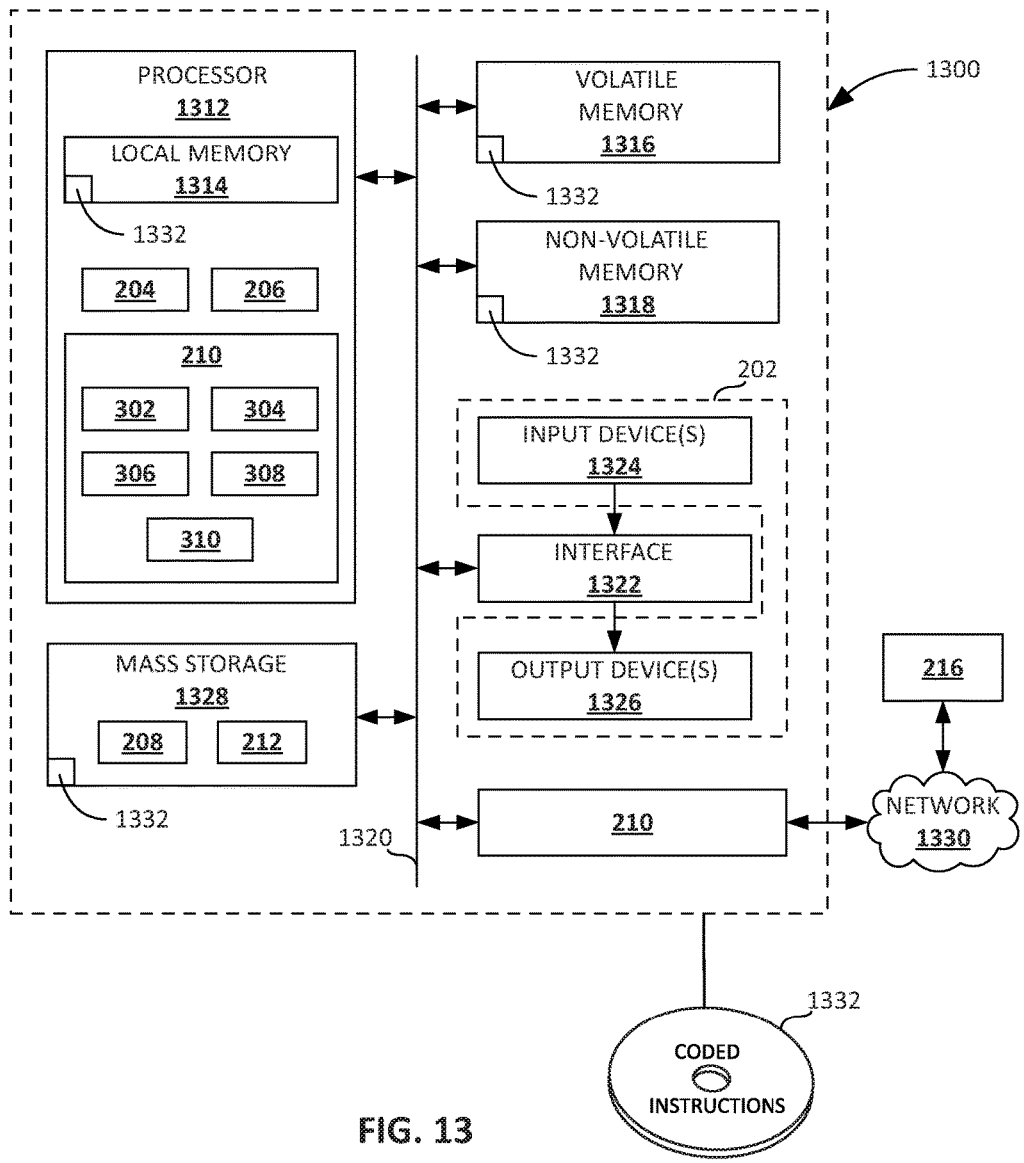
FIG. 13 is an example processor platform capable of executing instructions to implement the methods of FIGS. 8-12 and the example multi-module process control management system of FIGS. 2-3.

FIG. 13 is a block diagram of an example processor platform 1300 capable of executing instructions to implement the methods of FIGS. 8-12 and the example multi-module process control management system 200 of FIGS. 2-3. The processor platform 1300 can be, for example, a server, a personal computer, a tablet, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The example processor 1312 includes a local memory 1314 (e.g., a cache). The example processor 1312 also includes the example view manager 204, the example control module developer 206, the example configuration manager 210, the example module editor 302, the example module connection manager 304, the example module execution manager 306, the example block editor 308 and the example block connection manager 310 of FIGS. 2-3.

The processor 1312 of the illustrated example is in communication with a main memory including a volatile memory 1316 and a non-volatile memory 1318 via a bus 1320. The volatile memory 1316 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1318 may be implemented by flash memory and/or any other desired type of memory device. Access to the main memory 1316, 1318 is controlled by a memory controller.

The processor platform 1300 of the illustrated example also includes an interface circuit 1322. The interface circuit 1322 may be implemented by any type of interface standard, such as an Ethernet interface, a universal serial bus (USB), and/or a PCI express interface. In the illustrated example, one or more input devices 1324 are connected to the interface circuit 1322. The input device(s) 1324 permit(s) a user to enter data and commands into the processor 1312. The input device(s) can be implemented by, for example, a keyboard, a mouse, a touchscreen, a track-pad, a trackball, isopoint and/or a voice recognition system. One or more output devices 1326 are also connected to the interface circuit 1322 of the illustrated example. The output devices 1326 can be implemented, for example, by display devices (e.g., a liquid crystal display, a cathode ray tube display (CRT), a touchscreen and/or speakers). The interface circuit 1322 of the illustrated example, thus, typically includes a graphics driver card, a graphics driver chip or a graphics driver processor. In the illustrated example, the input device(s) 1324 and the output device(s) 1326 collectively form the example user interface 202 of FIG. 2.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. In the illustrated example, the mass storage device 1328 includes the example control module library 208 and the example configuration repository 212 of FIG. 2.

The processor platform 1300 of the illustrated example also includes the example controller interface 214 of FIG. 2. The controller interface 214 may be implemented by any type of interface standard, such as an Ethernet interface, a universal serial bus (USB), and/or a PCI express interface. The controller interface 214 permits data and/or commands generated and/or performed by the processor 1312, and/or stored by the local memory 1314, the volatile memory 1316, the non-volatile memory 1318 or the mass storage 1328 to be transmitted via a network 1330 (e.g., a local area network (LAN), an Ethernet connection, a digital subscriber line (DSL), a telephone line, coaxial cable, etc.) to the example controller 216 of FIG. 2 for execution.

Coded instructions 1332 to implement the methods of FIGS. 8-12 may be stored in the local memory 1314, in the volatile memory 1316, in the non-volatile memory 1318, in the mass storage device 1328, and/or on a removable tangible computer readable storage medium such as a CD or DVD.

From the foregoing, it will be appreciated that the disclosed methods, apparatus and systems advantageously enable a process control engineer (or any other end user of the disclosed multi-module process control management system) to adopt and/or implement a top-down approach to developing and/or troubleshooting complex process control strategies. The disclosed multi-module view enables the process control engineer to design a new process control strategy and/or to modify, test or debug an existing process control strategy and/or the running logic associated therewith at a more abstract level such as, for example, by defining the connections between individual control modules within the multi-module view without being bogged down in the logic details of the process control strategy from the outset of the design and/or modification thereof. As a compliment to the multi-module view, the disclosed single-module view enables the process control engineer to further edit and/or configure the logic details associated with selected ones of the control modules from the multi-module view should the need to do so arise.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
presenting, via a user interface operatively coupled to a controller of a process control system, a multi-module view including a first graphical representation of a control process to be implemented via the controller, the first graphical representation including a plurality of control modules corresponding to functions of the control process, respective ones of the control modules having a corresponding module input and a corresponding module output, the multi-module view providing a first set of configuration capabilities associated with the control modules, the first set of configuration capabilities including a capability to logically connect respective ones of the control modules via corresponding ones of the module inputs and corresponding ones of the module outputs;

in response to a module selection indication identifying a selected one of the control modules of the multi-module view, presenting, via the user interface, a single-module view including a second graphical representation, the second graphical representation including a functional block associated with the selected one of the control modules of the multi-module view, the functional block having a corresponding block input and a corresponding block output, the single-module view providing a second set of configuration capabilities associated with the functional block, the second set of configuration capabilities including a capability to logically connect the functional block to a respective one of the control modules via the corresponding block input or the corresponding block output, respective ones of the control modules of the multi-module view including a configurable module input name for the corresponding module input and a configurable module output name for the corresponding module output, the configurable module input name and the configurable module output name being viewable in the multi-module view, the functional block associated with the selected one of the control modules not being viewable in the multi-module view; and configuring the control process via the user interface using the first set of configuration capabilities and the second set of configuration capabilities.

2. The method of claim 1, wherein the first graphical representation of the control process represents a plurality of process functions of a piping and instrumentation diagram (P&ID) associated with the control process.

3. The method of claim 1, wherein the first graphical representation of the control process represents a program for execution on the controller.

4. The method of claim 1, wherein the single-module view includes a miniaturized representation of the multi-module view, the miniaturized representation providing an indication of the selected one of the control modules associated with the functional block of the single-module view.

5. The method of claim 4, wherein the miniaturized representation of the multi-module view presented in the single-module view is an interactive miniaturized representation configured to enable navigating from the selected one of the control modules of the multi-module view being presented in the single-module view to a different selected one of the control modules of the multi-module view to be presented in the single-module view in place of the selected one of the control modules.

6. The method of claim 1, wherein the first set of configuration capabilities includes a capability to configure an order of execution of the control modules.

7. The method of claim 1, wherein the first set of configuration capabilities includes a capability to generate an additional corresponding module input or an additional corresponding module output for a respective one of the control modules.

8. The method of claim 1, wherein the first set of configuration capabilities includes a capability to rename a corresponding module input or a corresponding module output of a respective one of the control modules.

9. The method of claim 1, wherein the first set of configuration capabilities includes a capability to configure a rate of execution for a respective one of the control modules.

10. The method of claim 1, wherein the second set of configuration capabilities includes a capability to logically connect the corresponding block output of the functional block to a corresponding module input of the respective one of the control modules.

11. The method of claim 1, wherein the second set of configuration capabilities includes a capability to logically connect the corresponding block input of the functional block to a corresponding module output of the respective one of the control modules.

12. The method of claim 1, further including generating the first graphical representation by selecting a preconfigured control module from a control module library.

13. The method of claim 12, wherein the preconfigured control module is reconfigurable.

14. The method of claim 1, further including generating the first graphical representation by selecting a control module class from a control module library, the control module class including a plurality of preconfigured control modules.

15. The method of claim 14, wherein respective ones of the preconfigured control modules are reconfigurable.

16. The method of claim 1, wherein respective ones of the control modules of the multi-module view include a configurable rate of execution and a configurable ordered position of execution for the control module, the configurable rate of execution and the configurable ordered position of execution being viewable in the multi-module view.

17. The method of claim 1, wherein the configuring is to produce a configured control process, the method further including implementing the configured control process via the controller.

18. An apparatus, comprising:
a user interface to be operatively coupled to a controller of a process control system, the user interface to (a) present a multi-module view including a first graphical representation of a control process to be implemented via the controller, the first graphical representation including a plurality of control modules corresponding to functions of the control process, respective ones of the control modules having a corresponding module input and a corresponding module output, and (b) in response to a module selection indication identifying a selected one of the control modules of the multi-module view, present a single-module view including a second graphical representation, the second graphical representation including a functional block associated with the selected one of the control modules of the multi-module view, the functional block having a corresponding block input and a corresponding block output, respective ones of the control modules of the multi-module view including a configurable module input name for the corresponding module input and a configurable module output name for the corresponding module output, the configurable module input name and the configurable module output name being viewable in the multi-module view, the functional block associated with the selected one of the control modules not being viewable in the multi-module view; and a configuration manager operatively coupled to the user interface, the configuration manager to (a) provide, for the multi-module view, a first set of configuration capabilities associated with the control modules, the first set of configuration capabilities including a capability to logically connect, via a module connection manager, respective ones of the control modules via corresponding ones of the module inputs and corresponding ones of the module outputs, and (b) provide, for the single-module view, a second set of configuration capabilities associated with the functional block, the second set of configuration capabilities including a capability to logically connect, via a block connection manager, the functional block to a respective one of the control modules via the corresponding block input or the corresponding block output;

wherein the user interface is further to configure the control process using the first set of configuration capabilities and the second set of configuration capabilities provided via the configuration manager.

19. The apparatus of claim 18, wherein the second set of configuration capabilities includes a capability to logically connect, via the block connection manager, the corresponding block output of the functional block to a corresponding module input of the respective one of the control modules.

20. The apparatus of claim 18, wherein the second set of configuration capabilities includes a capability to logically connect, via the block connection manager, the corresponding block input of the functional block to a corresponding module output of the respective one of the control modules.

21. A tangible machine-readable storage medium comprising instructions that, when executed, cause a machine to, at least:

present, via a user interface operatively coupled to a controller of a process control system, a multi-module view including a first graphical representation of a control process to be implemented via the controller, the first graphical representation including a plurality of control modules corresponding to functions of the control process, respective ones of the control modules having a corresponding module input and a corresponding module output, the multi-module view providing a first set of configuration capabilities associated with the control modules, the first set of configuration capabilities including a capability to logically connect respective ones of the control modules via corresponding ones of the module inputs and corresponding ones of the module outputs;

in response to a module selection indication identifying a selected one of the control modules of the multi-module view, present, via the user interface, a single-module view including a second graphical representation, the second graphical representation including a functional block associated with the selected one of the control modules of the multi-module view, the functional block having a corresponding block input and a corresponding block output, the single-module view providing a second set of configuration capabilities associated with the functional block, the second set of configuration capabilities including a capability to logically connect the functional block to a respective one of the control modules via the corresponding block input or the corresponding block output, respective ones of the control modules of the multi-module view including a configurable module input name for the corresponding module input and a configurable module output name for the corresponding module output, the configurable module input name and the configurable module output name being viewable in the multi-module view, the functional block associated with the selected one of the control modules not being viewable in the multi-module view; and configure the control process via the user interface using the first set of configuration capabilities and the second set of configuration capabilities.

22. The machine-readable storage medium of claim 21, wherein the second set of configuration capabilities includes a capability to logically connect the corresponding block output of the functional block to a corresponding module input of the respective one of the control modules.

23. The machine-readable storage medium of claim 21, wherein the second set of configuration capabilities includes a capability to logically connect the corresponding block input of the functional block to a corresponding module output of the respective one of the control modules.

* * * * *